(12) United States Patent
Tsukamoto et al.

(10) Patent No.: US 11,118,902 B2
(45) Date of Patent: Sep. 14, 2021

(54) THREE-DIMENSIONAL SHAPE MEASUREMENT DEVICE, ROBOT SYSTEM, AND THREE-DIMENSIONAL SHAPE MEASUREMENT METHOD

(71) Applicant: Seiko Epson Corporation, Tokyo (JP)

(72) Inventors: Kentaro Tsukamoto, Azumino (JP); Tomoki Harada, Azumino (JP)

(73) Assignee: Seiko Epson Corporation

( * ) Notice: Subject to any disclaimer, the term of this patent is extended or adjusted under 35 U.S.C. 154(b) by 545 days.

(21) Appl. No.: 16/048,421

(22) Filed: Jul. 30, 2018

(65) Prior Publication Data
US 2019/0033065 A1   Jan. 31, 2019

(30) Foreign Application Priority Data

Jul. 31, 2017  (JP) .............................. JP2017-147587

(51) Int. Cl.
| | |
|---|---|
| *G06T 7/60* | (2017.01) |
| *G01B 11/25* | (2006.01) |
| *B25J 19/02* | (2006.01) |
| *G06T 7/521* | (2017.01) |
| *G06T 7/55* | (2017.01) |
| *B25J 13/08* | (2006.01) |
| *B25J 9/16* | (2006.01) |
| *H04N 5/232* | (2006.01) |

(52) U.S. Cl.
CPC .......... *G01B 11/254* (2013.01); *B25J 9/1697* (2013.01); *B25J 13/08* (2013.01); *B25J 19/021* (2013.01); *G01B 11/2527* (2013.01); *G06T 7/521* (2017.01); *G06T 7/55* (2017.01); *G06T 2207/10016* (2013.01); *G06T 2207/10152* (2013.01); *G06T 2207/30164* (2013.01); *H04N 5/23299* (2018.08)

(58) Field of Classification Search
CPC .. G01B 11/254; G01B 11/2527; B25J 9/1697; B25J 19/021; B25J 13/08; G06T 7/521; G06T 7/55; G06T 2207/30164; G06T 2207/10016; G06T 2207/10152; H04N 5/23299
See application file for complete search history.

(56) References Cited

U.S. PATENT DOCUMENTS 5,031,154 A * 7/1991 Watanabe ................ G03H 3/00
                                                     367/8
9,124,873 B2 * 9/2015 Liu .......................... G06T 7/80
(Continued)

FOREIGN PATENT DOCUMENTS

| JP | 2012-159412 A | 8/2012 |
| JP | 2014-059239 A | 4/2014 |

*Primary Examiner* — Masud Ahmed
(74) *Attorney, Agent, or Firm* — Harness, Dickey & Pierce, P.L.C.

(57) ABSTRACT

A three-dimensional shape measurement device includes a controller, in which the controller starts a process in which a plurality of different phase pattern images is projected by a projector, whenever the phase pattern image is projected by the projector before a rising time elapses, the rising time being a time until the luminance of light does not temporally change after a light source of the projector applies the light, and measures a three-dimensional shape of a target object onto which the phase pattern image is projected on the basis of a captured image obtained by the camera after the process is performed.

7 Claims, 9 Drawing Sheets

(56) References Cited

U.S. PATENT DOCUMENTS

| | | | |
|---|---|---|---|
| 2012/0194641 A1* | 8/2012 | Kimura | G01B 11/2527 348/42 |
| 2015/0049331 A1* | 2/2015 | Ri | G01B 11/2527 356/73 |
| 2016/0034746 A1* | 2/2016 | Harada | G06T 7/521 382/154 |
| 2016/0346882 A1* | 12/2016 | Yamazaki | B23P 19/04 |
| 2017/0302902 A1* | 10/2017 | Martinello | H04N 13/207 |
| 2017/0370706 A1* | 12/2017 | Nakatsukasa | G06T 7/521 |
| 2018/0040118 A1* | 2/2018 | Seo | G06T 7/0006 |
| 2019/0212130 A1* | 7/2019 | Wang | G06T 7/521 |

* cited by examiner

THREE-DIMENSIONAL SHAPE MEASUREMENT DEVICE, ROBOT SYSTEM, AND THREE-DIMENSIONAL SHAPE MEASUREMENT METHOD

BACKGROUND

1. Technical Field

The present invention relates to a three-dimensional shape measurement device, a robot system, and a three-dimensional shape measurement method.

2. Related Art

Research or development on a technique of measuring a three-dimensional shape of a target object is being performed.

In relation thereto, there is a shape measurement device using a phase shift method (refer to JP-A-2012-159412).

In the phase shift method, each of a plurality of sine wave patterns having different phases is projected onto a target object by a projection unit, and the target object onto which the sine wave patterns are projected is imaged by an imaging unit. Thus, such a shape measurement device waits without the imaging unit imaging the target object onto which the sine wave patterns are projected until the luminance of light does not temporally change after a light source included in the projection unit applies the light. As a result, it is difficult for the shape measurement device to reduce the time required to measure a three-dimensional shape of a target object.

SUMMARY

A three-dimensional shape measurement device according to an aspect of the invention includes a controller, in which the controller starts a process in which each of a plurality of different phase pattern images is projected by a projection unit, and the phase pattern image is imaged by an imaging unit whenever each phase pattern image is projected by the projection unit until a rising time elapses, the rising time being a time until the luminance of light does not temporally change after a light source of the projection unit applies the light, and measures a three-dimensional shape of a target object onto which the phase pattern image is projected on the basis of a captured image obtained by the imaging unit after the process is performed.

With this configuration, the three-dimensional shape measurement device starts a process in which each of a plurality of different phase pattern images is projected by a projection unit, and the phase pattern image is imaged by an imaging unit whenever each phase pattern image is projected by the projection unit until a rising time elapses, the rising time being a time until the luminance of light does not temporally change after a light source of the projection unit applies the light, and measures a three-dimensional shape of a target object onto which the phase pattern image is projected on the basis of a captured image obtained by the imaging unit after the process is performed. Consequently, the three-dimensional shape measurement device can reduce the time required to measure a three-dimensional shape of the target object.

According to another aspect of the invention, the three-dimensional shape measurement device may have a configuration in which the plurality of phase pattern images are four phase pattern images, each of the four phase pattern images represents a wave in which a luminance value periodically changes along a first direction on the phase pattern image, the four phase pattern images include a first phase pattern image which is a phase pattern image representing a reference wave, a second phase pattern image which is a phase pattern image representing a wave of which a phase advances by 90 degrees with respect to the wave represented by the first phase pattern image, a third phase pattern image which is a phase pattern image representing a wave of which a phase advances by 90 degrees with respect to the wave represented by the second phase pattern image, and a fourth phase pattern image which is a phase pattern image representing a wave of which a phase advances by 90 degrees with respect to the wave represented by the third phase pattern image, and the controller causes the projection unit to project the four phase pattern images in an order of the first phase pattern image, the third phase pattern image, the second phase pattern image, and the fourth phase pattern image.

With this configuration, the three-dimensional shape measurement device causes the projection unit to project the four phase pattern images in an order of the first phase pattern image, the third phase pattern image, the second phase pattern image, and the fourth phase pattern image. Consequently, the three-dimensional shape measurement device can reduce an error and can also reduce the time required to measure a three-dimensional shape of the target object on the basis of the first phase pattern image, the second phase pattern image, the third phase pattern image, and the fourth phase pattern image which are projected by the projection unit in the order of the first phase pattern image, the third phase pattern image, the second phase pattern image, and the fourth phase pattern image.

According to still another aspect of the invention, in the three-dimensional shape measurement device, the controller may include an operation reception unit that receives an operation, an image generation unit that generates the plurality of phase pattern images in response to an operation received by the operation reception unit, a timing control unit that controls projection timings at which the projection unit projects the plurality of phase pattern images generated by the image generation unit and imaging timings at which the imaging unit images the plurality of phase pattern images projected by the projection unit, a projection control unit that causes the projection unit to project each of the plurality of phase pattern images generated by the image generation unit according to the projection timings controlled by the timing control unit, an imaging control unit that causes the imaging unit to image the phase pattern images according to the imaging timings controlled by the timing control unit, and a three-dimensional shape measurement unit that measures a three-dimensional shape of the target object on the basis of the captured image obtained by the imaging unit.

The three-dimensional shape measurement device receives an operation, generates a plurality of phase pattern images in response to a received operation, controls a projection timing at which the projection unit projects each of the plurality of generated phase pattern images and an imaging timing at which the imaging unit images each of the phase pattern images projected by the projection unit, causes the projection unit to project each of the plurality of generated phase pattern images according to the controlled projection timing, causes the imaging unit to image each phase pattern image according to the controlled imaging timing, and measures a three-dimensional shape of the target object on the basis of a captured image obtained by the imaging unit. Consequently, the three-dimensional shape measurement device can reduce the time required to measure a three-dimensional shape of the target object on the basis of the projection timing and the imaging timing.

According to still another aspect of the invention, in the three-dimensional shape measurement device, the operation reception unit may receive the operation from a user.

With this configuration, the three-dimensional shape measurement device receives an operation from the user. Consequently, the three-dimensional shape measurement device can reduce the time required to measure a three-dimensional shape of the target object according to the operation received from the user.

According to still another aspect of the invention, in the three-dimensional shape measurement device, the operation reception unit may receive a request from another device as the operation.

With this configuration, the three-dimensional shape measurement device receives a request from another device as the operation. Consequently, the three-dimensional shape measurement device can reduce the time required to measure a three-dimensional shape of the target object according to the operation received from another device.

According to still another aspect of the invention, in the three-dimensional shape measurement device, the controller may measure a three-dimensional shape of the target object onto which the phase pattern image is projected, by using a phase shift method based on a captured image obtained by the imaging unit.

With this configuration, the three-dimensional shape measurement device measures a three-dimensional shape of a target object onto which a phase pattern image is projected by using the phase shift method based on a captured image obtained by the imaging unit. Consequently, the three-dimensional shape measurement device can reduce the time required to measure a three-dimensional shape of the target object according to the phase shift method.

According to still another aspect of the invention, there is provided a robot system including a three-dimensional shape measurement device that includes a controller and measures a three-dimensional shape of a target object; a robot; and a robot control device that moves the robot on the basis of a three-dimensional shape of the target object measured by the three-dimensional shape measurement device, in which the controller starts a process in which each of a plurality of different phase pattern images is projected by a projection unit, and the phase pattern image is imaged by an imaging unit whenever each phase pattern image is projected by the projection unit until a rising time elapses, the rising time being a time until the luminance of light does not temporally change after a light source of the projection unit applies the light, and measures a three-dimensional shape of the target object onto which the phase pattern image is projected on the basis of a captured image obtained by the imaging unit after the process is performed.

With this configuration, the robot system starts a process in which each of a plurality of different phase pattern images is projected by a projection unit, and the phase pattern image is imaged by an imaging unit whenever each phase pattern image is projected by the projection unit until the rising time elapses, the rising time being a time until the luminance of light does not temporally change after a light source of the projection unit applies the light, and measures a three-dimensional shape of a target object onto which the phase pattern image is projected on the basis of a captured image obtained by the imaging unit after the process is performed. Consequently, the robot system can reduce the time required for work performed by a robot.

According to still another aspect of the invention, there is provided a three-dimensional shape measurement method including starting a process in which each of a plurality of different phase pattern images is projected by a projection unit, and the phase pattern image is imaged by an imaging unit whenever each phase pattern image is projected by the projection unit until a rising time elapses, the rising time being a time until the luminance of light does not temporally change after a light source of the projection unit applies the light; and measuring a three-dimensional shape of a target object onto which the phase pattern image is projected on the basis of a captured image obtained by the imaging unit after the process is performed.

With this configuration, in the three-dimensional shape measurement method, a process is started in which each of a plurality of different phase pattern images is projected by a projection unit, and the phase pattern image is imaged by an imaging unit whenever each phase pattern image is projected by the projection unit until the rising time elapses, the rising time being a time until the luminance of light does not temporally change after a light source of the projection unit applies the light, and a three-dimensional shape of a target object onto which the phase pattern image is projected is measured on the basis of a captured image obtained by the imaging unit after the process is performed. Consequently, in the three-dimensional shape measurement method, it is possible to reduce the time required to measure a three-dimensional shape of the target object.

According to still another aspect of the invention, there is provided a robot system including a three-dimensional shape measurement device that includes a processor and measures a three-dimensional shape of a target object; a robot; and a robot control device that moves the robot on the basis of a three-dimensional shape of the target object measured by the three-dimensional shape measurement device, in which the processor is configured to execute commands for starting a process in which each of a plurality of different phase pattern images is projected by a projection unit, and the phase pattern image is imaged by an imaging unit whenever each phase pattern image is projected by the projection unit until a rising time elapses, the rising time being a time until the luminance of light does not temporally change after a light source of the projection unit applies the light, and to measure a three-dimensional shape of a target object onto which the phase pattern image is projected on the basis of a captured image obtained by the imaging unit after the process is performed.

With this configuration, the robot system starts a process in which each of a plurality of different phase pattern images is projected by a projection unit, and the phase pattern image is imaged by an imaging unit whenever each phase pattern image is projected by the projection unit until the rising time elapses, the rising time being a time until the luminance of light does not temporally change after a light source of the projection unit applies the light, and measures a three-dimensional shape of a target object onto which the phase pattern image is projected on the basis of a captured image obtained by the imaging unit after the process is performed. Consequently, the robot system can reduce the time required for work performed by a robot.

As described above, in the three-dimensional shape measurement device and the three-dimensional shape measurement method, a process is started in which each of a plurality of different phase pattern images is projected by a projection unit, and the phase pattern image is imaged by an imaging unit whenever each phase pattern image is projected by the projection unit until the rising time elapses, the rising time being a time until the luminance of light does not temporally change after a light source of the projection unit applies the light, and a three-dimensional shape of a target object onto which the phase pattern image is projected is measured on the basis of a captured image obtained by the imaging unit after the process is performed. Consequently, in the three-dimensional shape measurement device and the three-dimensional shape measurement method, it is possible to reduce the time required to measure a three-dimensional shape of the target object.

The robot system starts a process in which each of a plurality of different phase pattern images is projected by a projection unit, and the phase pattern image is imaged by an imaging unit whenever each phase pattern image is projected by the projection unit until the rising time elapses, the rising time being a time until the luminance of light does not temporally change after a light source of the projection unit applies the light, and measures a three-dimensional shape of a target object onto which the phase pattern image is projected on the basis of a captured image obtained by the imaging unit after the process is performed. Consequently, the robot system can reduce the time required for work performed by a robot.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Figure 1:
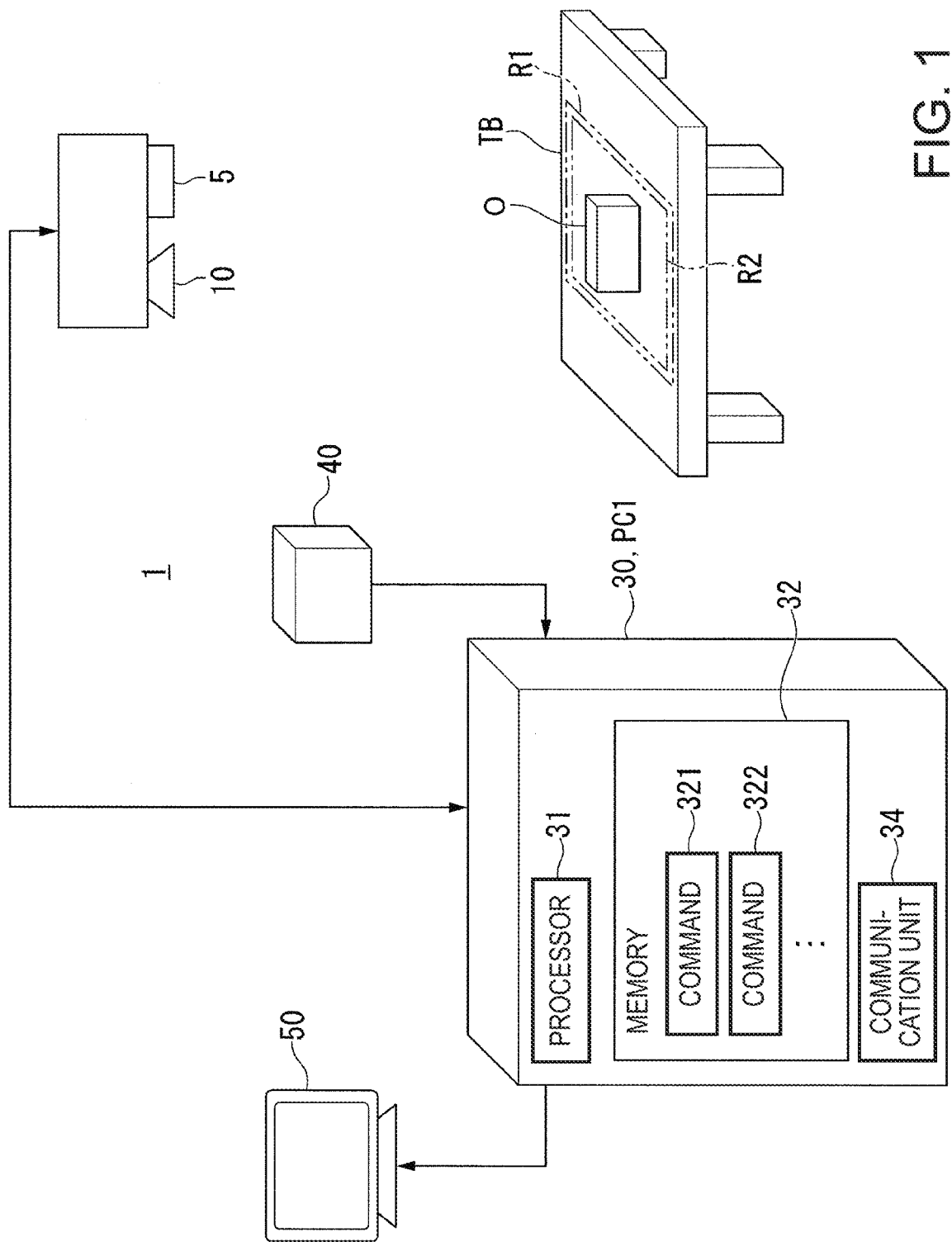
FIG. 1 is a diagram illustrating an example of a configuration of a three-dimensional shape measurement system according to an embodiment.

Hereinafter, an embodiment of the invention will be described with reference to the drawings.

Overview of Three-Dimensional Shape Measurement System

First, a description will be made of an overview of a three-dimensional shape measurement system 1.

The three-dimensional shape measurement system 1 projects a phase pattern image onto a target object with a projection unit, images the target object onto which the phase pattern image is projected with an imaging unit, and measures a three-dimensional shape of the target object on the basis of a captured image of the target object. The phase pattern image is a projection image representing a wave (for example, a sine wave) in which a pixel value on an image periodically changes along a first direction on the image in the projection image projected by the projection unit. In this example, the first direction is a direction along a longitudinal direction of a projection image. The first direction may be another direction on a projection image instead of the direction along the longitudinal direction. The pixel value is a luminance value in this example. The pixel value may be other values such as a brightness value or a saturation value instead of the luminance value.

Here, the luminance of light applied from a light source included in the projection unit temporally changes until physical characteristics of the light source are stabilized after the light source starts to apply the light. Hereinafter, for convenience of description, the time until physical characteristics of the light source are stabilized after the light source starts to apply the light will be referred to as a rising time. In other words, the luminance of light applied from the light source does not temporally change except for fluctuation caused by a voltage fluctuation or a reduction due to deterioration in the light source after the rising time elapses from the time at which the light source applies the light.

In a case where the luminance of light applied from the light source temporally changes, an average luminance value on a phase pattern image also changes according to the change in the luminance. An average luminance value on a certain phase pattern image is an average value of luminance values at respective points on the phase pattern image. In this case, an error may increase in measurement of a three-dimensional shape based on a captured image obtained by the imaging unit imaging a target object onto which a phase pattern image is projected.

For this reason, a three-dimensional shape measurement system X (for example, a three-dimensional shape measurement system of the related art) which is different from the three-dimensional shape measurement system 1 waits without imaging a target object O with an imaging unit until the rising time elapses from the time at which the light source applies light after a phase pattern image is projected onto the target object with a projection unit. As a result, there is a case where it is difficult for the three-dimensional shape measurement system X to reduce the time required to measure a three-dimensional shape of the target object.

Therefore, the three-dimensional shape measurement system 1 starts a projection imaging process in which each of a plurality of different phase pattern images is projected by the projection unit, and the phase pattern image is imaged by the imaging unit whenever each phase pattern image is projected by the projection unit until the rising time elapses, the rising time being a time until the luminance of light does not temporally change after a light source included in the projection unit applies the light. The three-dimensional shape measurement system 1 performs the projection imaging process, and then measures a three-dimensional shape of the target object onto which the phase pattern image is projected on the basis of a captured image obtained by the imaging unit. Consequently, the three-dimensional shape measurement system 1 can reduce the time required to measure a three-dimensional shape of the target object.

Hereinafter, a description will be made of a configuration of the three-dimensional shape measurement system 1, a process in which the three-dimensional shape measurement system 1 reduces an error occurring when a three-dimensional shape of a target object is measured, and a process in which the three-dimensional shape measurement system 1 measures a three-dimensional shape of a target object.

Configuration of Three-Dimensional Shape Measurement System

Hereinafter, a description will be made of a configuration of the three-dimensional shape measurement system 1.

FIG. 1 is a diagram illustrating an example of the three-dimensional shape measurement system 1 according to the embodiment. The three-dimensional shape measurement system 1 includes a projection unit 5 which is an example of the above-described projection unit, an imaging unit 10 which is an example of the above-described imaging unit, a three-dimensional shape measurement device 30, an input device 40, and a display device 50. The three-dimensional shape measurement system 1 may have a configuration in which some or all of the projection unit 5, the imaging unit 10, the input device 40, and the display device 50 are not included, may have a configuration in which some or all of the projection unit 5, the imaging unit 10, and the three-dimensional shape measurement device 30 are integrally formed with each other, may have a configuration in which the input device 40 may be integrally formed with the display device 50 as a touch panel device, and may have a configuration in which one or both of the input device 40 and the display device 50 are integrally formed with the three-dimensional shape measurement device 30.

The projection unit 5 is, for example, a projector including a liquid crystal light valve, a projection lens, and a liquid crystal drive portion, for projecting a projection image. The projection unit 5 is a projector including an ultrahigh pressure mercury lamp or a metal halide lamp as a light source. The projection unit 5 is provided at a position where a projection image can be projected within a projection region R1 which is a region including a target object O mounted on a surface of a workbench TB illustrated in FIG. 1.

The workbench TB is, for example, a stand such as a table. The workbench TB may be other stands as long as the target object O can be mounted on the stands instead of the table.

The target object O is an example of the above-described target object. The target object O is an industrial component or member such as a plate, a nut, or a bolt assembled into a product. For simplification of the drawing, FIG. 1 illustrates the target object O as a rectangular object. The target object O may be other objects such as daily necessities or a living body instead of an industrial component or member. A shape of the target object O may be other shapes instead of a rectangular shape.

The projection unit 5 is communicably connected to the three-dimensional shape measurement device 30 via a cable. Wired communication using the cable is performed on the basis of a standard such as Ethernet (registered trademark) or a Universal Serial Bus (USB). The projection unit 5 may be connected to the three-dimensional shape measurement device 30 through wireless communication performed on the basis of a communication standard such as Wi-Fi (registered trademark).

The imaging unit 10 is, for example, a camera which includes a charge coupled device (CCD) or a complementary metal oxide semiconductor (CMOS) as an imaging element which converts collected light into an electric signal. The imaging unit 10 is provided at a position where an imaging region R2 which is a region including the target object O mounted on the surface of the workbench TB illustrated in FIG. 1 can be imaged. Hereinafter, as an example, a description will be made of a case where the entire imaging region R2 is included in the projection region R1. Alternatively, the imaging region R2 may partially overlap the projection region R1, and may include the entire projection region R1 therein.

The imaging unit 10 is communicably connected to the three-dimensional shape measurement device 30 via a cable. Wired communication using the cable is performed on the basis of a standard such as Ethernet (registered trademark) or a USB. The imaging unit 10 may be connected to the three-dimensional shape measurement device 30 through wireless communication performed on the basis of a communication standard such as Wi-Fi (registered trademark).

The three-dimensional shape measurement device 30 is formed of at least one processor and at least one memory. In the three-dimensional shape measurement device 30, at least one processor may be provided in a single device, and may be distributed and provided in a plurality of information processing devices. In the three-dimensional shape measurement device 30, at least one memory may be provided in a single device, and may be distributed and provided in a plurality of information processing devices.

In the example illustrated in FIG. 1, the three-dimensional shape measurement device 30 is formed of a processor 31 which is a single processor provided in an information processing device PC1 and a memory 32 which is a single memory provided in the information processing device PC1. The information processing device PC1 may include other processors in addition to the processor 31, and may include other memories in addition to the memory 32.

The information processing device PC1 is, for example, a workstation, a desktop personal computer (PC), a notebook PC, a tablet PC, a multi-function mobile phone (smart phone), an electronic book reader with a communication function, or a personal digital assistant (PDA).

The processor 31 is, for example, a central processing unit (CPU). The processor 31 may be other processors such as a field programmable gate array (FPGA). The processor 31 executes various commands stored in the memory 32. The processor 31 executes various commands stored in a memory of another device.

The memory 32 includes, for example, a hard disk drive (HDD), a solid state drive (SSD), an electrically erasable programmable read only memory (EEPROM), a read only memory (ROM), and a random access memory (RAM). In other words, the memory 32 includes a transitory storage device and a non-transitory storage device. Instead of being built into the information processing device PC1, the memory 32 may be an externally attached storage device connected thereto via a digital input/output port such as a USB. The memory 32 stores various pieces of information processed by the processor 31 or processors of other devices, various commands (for example, programs or codes) which can be executed by a computer, such as commands 321 and 322, and various images.

The command 321 and the command 322 are some of a plurality of commands (that is, a plurality of commands which can be executed by a computer) executed by the processor 31 in order for the processor 31 to form the three-dimensional shape measurement device 30.

The information processing device PC1 includes a communication unit 34 as a hardware functional unit in order to perform communication with other devices.

The communication unit 34 is configured to include a digital input/output port such as a USB, an Ethernet (registered trademark) port, and the like.

Figure 2:
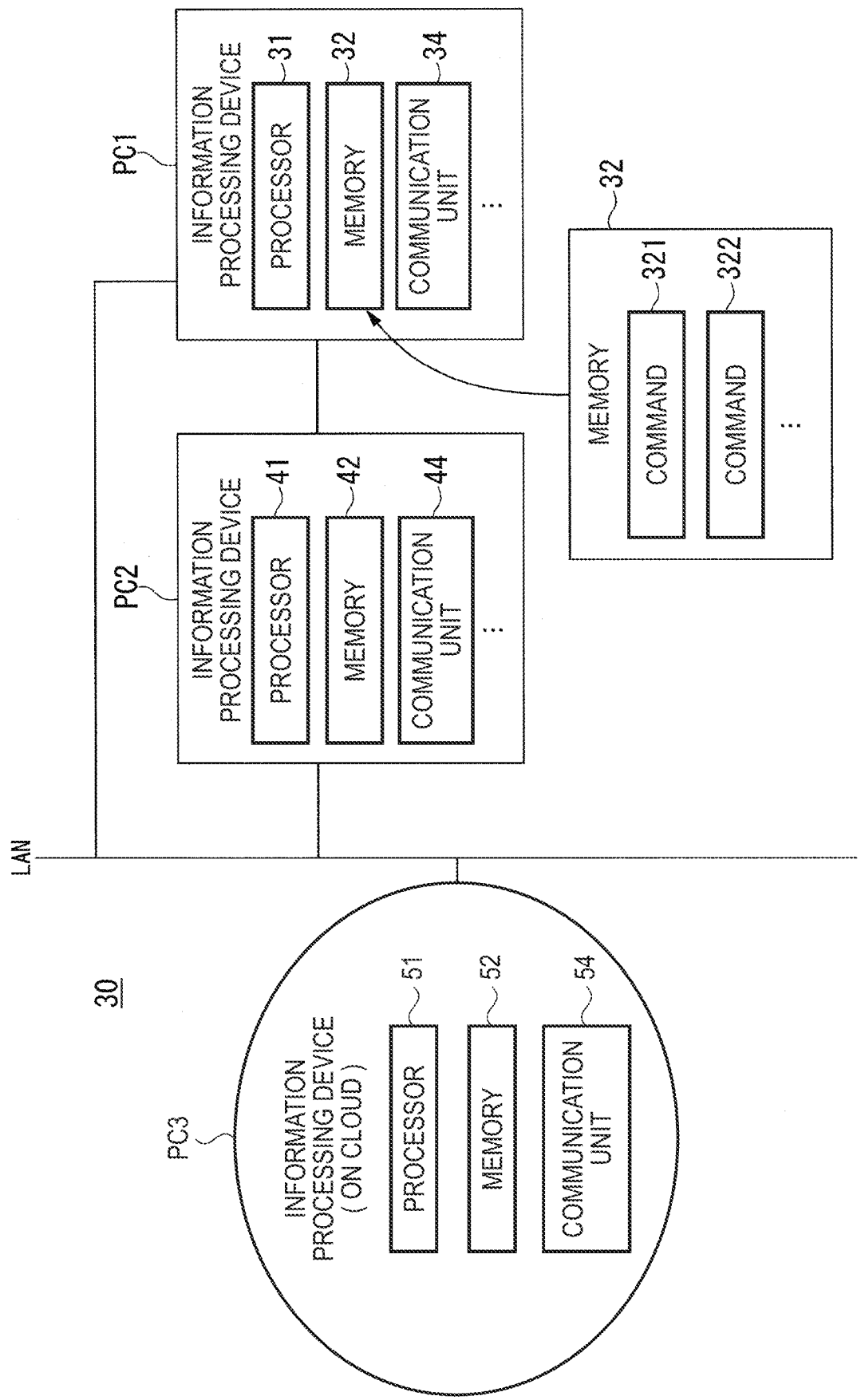
FIG. 2 is a diagram illustrating an example of a hardware configuration of a three-dimensional shape measurement device in a case where the three-dimensional shape measurement device is formed of a plurality of information processing devices.

The three-dimensional shape measurement device 30 may be formed of some or all of a plurality of information processing devices as illustrated in FIG. 2 instead of the information processing device PC1 including the single processor 31 and the single memory 32. FIG. 2 is a diagram illustrating an example of a hardware configuration of the three-dimensional shape measurement device 30 in a case where the three-dimensional shape measurement device 30 is formed of a plurality of information processing devices.

An information processing device PC2 illustrated in FIG. 2 includes a processor 41 which is a single processor, a memory 42 which is a single memory, and a communication unit 44. The information processing device PC2 may include other processors in addition to the processor 41. The information processing device PC2 may include other memories in addition to the memory 42.

The information processing device PC2 is, for example, a workstation, a desktop PC, a notebook PC, a tablet PC, a multi-function mobile phone (smart phone), an electronic book reader with a communication function, or a PDA.

The processor 41 is, for example, a CPU. The processor 41 may be other processors such as an FPGA. The processor 41 executes various commands stored in the memory 42. The processor 41 executes various commands stored in a memory of another device.

The memory 42 includes, for example, an HDD, an SSD, an EEPROM, a ROM, and a RAM. In other words, the memory 42 includes a transitory storage device and a non-transitory storage device. Instead of being built into the information processing device PC2, the memory 42 may be an externally attached storage device connected thereto via a digital input/output port such as a USB. The memory 42 stores various pieces of information processed by the processor 41 or processors of other devices, various commands (for example, programs or codes) which can be executed by a computer, and various images.

The communication unit 44 is configured to include a digital input/output port such as a USB, an Ethernet (registered trademark) port, and the like.

An information processing device PC3 illustrated in FIG. 2 includes a processor 51 which is a single processor, a memory 52 which is a single memory, and a communication unit 54. The information processing device PC3 may include other processors in addition to the processor 51. The information processing device PC3 may include other memories in addition to the memory 52.

The information processing device PC3 is, for example, a workstation, a desktop PC, a notebook PC, a tablet PC, a multi-function mobile phone (smart phone), an electronic book reader with a communication function, or a PDA.

The processor 51 is, for example, a CPU. The processor 51 may be other processors such as an FPGA. The processor 51 executes various commands stored in the memory 52. The processor 51 executes various commands stored in a memory of another device.

The memory 52 includes, for example, an HDD, an SSD, an EEPROM, a ROM, and a RAM. In other words, the memory 52 includes a transitory storage device and a non-transitory storage device. Instead of being built into the information processing device PC3, the memory 52 may be an externally attached storage device connected thereto via a digital input/output port such as a USB. The memory 52 stores various pieces of information processed by the processor 51 or processors of other devices, various commands (for example, programs or codes) which can be executed by a computer, and various images.

The communication unit 54 is configured to include a digital input/output port such as a USB, an Ethernet (registered trademark) port, and the like.

In the example illustrated in FIG. 2, the information processing device PC1 and the information processing device PC2 are communicably connected to each other in a wireless or wired manner. In this example, the information processing device PC1 and the information processing device PC3 are communicably connected to each other in a wireless or wired manner via a local area network (LAN). In this example, the information processing device PC2 and the information processing device PC3 are communicably connected to each other in a wireless or wired manner via the LAN.

In the example illustrated in FIG. 2, the three-dimensional shape measurement device 30 is formed of at least one of the processor 31, the processor 41, and the processor 51, and at least one of the memory 32, the memory 42, and the memory 52. In a case where the three-dimensional shape measurement device 30 is formed of two or more of the processor 31, the processor 41, and the processor 51, the two or more processors forming the three-dimensional shape measurement device 30 perform communication with each other via the communication units so as to realize a function of the three-dimensional shape measurement device 30 in cooperation with each other. In this case, the two or more processors perform a process based on the function of the three-dimensional shape measurement device 30 according to commands stored in at least one of the memory 32, the memory 42, and the memory 52.

As in the example illustrated in FIG. 2, in a case where the three-dimensional shape measurement device 30 is formed of a plurality of information processing devices, each of the projection unit 5 and the imaging unit 10 is communicably connected to at least one of the plurality of information processing devices. In this case, each of the input device 40 and the display device 50 is communicably connected to at least one of the plurality of information processing devices.

FIG. 1 is referred to again. The three-dimensional shape measurement device 30 projects a phase pattern image onto the projection region R1 with the projection unit 5. The three-dimensional shape measurement device 30 images the imaging region R2 included in the projection region R1 onto which the phase pattern image is projected with the imaging unit 10. The target object O is included in the imaging region R2. In other words, the three-dimensional shape measurement device 30 causes the imaging unit 10 to image the imaging region R2 which is a region including the target object O. The three-dimensional shape measurement device 30 acquires a captured image obtained by the imaging unit 10 from the imaging unit 10. The three-dimensional shape measurement device 30 measures a three-dimensional shape of the target object O on the basis of the acquired captured image. Here, in this example, measuring a three-dimensional shape of the target object O indicates generating three-dimensional shape information which is information indicating the three-dimensional shape of the target object O.

Specifically, the three-dimensional shape measurement device 30 measures a three-dimensional position (three-dimensional coordinate) of a point for each point which is located on the acquired captured image and is included in a target object region in which the target object O is imaged among regions in the captured image, and correlates the measured three-dimensional position with the point. In the above-described way, the three-dimensional shape measurement device 30 generates a captured image in which the imaging region R2 including the target object O is imaged and a three-dimensional position is correlated with each point in the target object region, as the three-dimensional shape information indicating a three-dimensional shape of the target object O.

Here, a three-dimensional position measured from a captured image may be a three-dimensional position in a robot coordinate system, may be a three-dimensional position in a world coordinate system, and may be three-dimensional positions in other three-dimensional coordinate systems. Hereinafter, as an example, a description will be made of a case where the three-dimensional shape measurement device 30 measures a three-dimensional position in a robot coordinate system of each point included in a target object region on the basis of an acquired captured image.

Hereinafter, a description will be made of a case where, in the three-dimensional shape measurement device 30, calibration of correlating a coordinate on an XY plane in an imaging unit coordinate system indicating a position of each point on a captured image obtained by the imaging unit with a coordinate on an XY plane in the robot coordinate system is performed in advance. The XY plane in the imaging unit coordinate system is a plane extending along an X axis and a Y axis in the imaging unit coordinate system. The XY plane in the robot coordinate system is a plane extending along an X axis and a Y axis in the robot coordinate system.

The input device 40 is, for example, a keyboard, a mouse, and a touch pad. The input device 40 may be other input devices.

The input device 40 is communicably connected to the three-dimensional shape measurement device 30 via a cable. Wired communication using the cable is performed on the basis of a standard such as Ethernet (registered trademark) or a USB. The input device 40 may be connected to the three-dimensional shape measurement device 30 through wireless communication performed on the basis of a communication standard such as short-range radio communication or Wi-Fi (registered trademark).

The display device 50 is a display including a liquid crystal display panel or an organic electroluminescence (EL) display panel. The display device 50 may be other display devices.

The display device 50 is communicably connected to the three-dimensional shape measurement device 30 via a cable. Wired communication using the cable is performed on the basis of a standard such as Ethernet (registered trademark) or a USB. The display device 50 may be connected to the three-dimensional shape measurement device 30 through wireless communication performed on the basis of a communication standard such as short-range radio communication or Wi-Fi (registered trademark).

Method of Three-Dimensional Shape Measurement Device Measuring Three-Dimensional Shape of Target Object Hereinafter, a description will be made of a method of the three-dimensional shape measurement device 30 measuring a three-dimensional shape of the target object O.

The three-dimensional shape measurement device 30 measures a three-dimensional shape of the target object O by using a plurality of different phase pattern images according to a reformed phase shift method which is a phase shift method in this example. More specifically, as described above, the three-dimensional shape measurement device 30 starts a projection imaging process in which each of a plurality of different phase pattern images is projected by the projection unit, and the phase pattern image is imaged with the imaging unit whenever each phase pattern image is projected by the projection unit until the rising time elapses after a light source included in the projection unit 5 applies the light. In the projection imaging process, the three-dimensional shape measurement device 30 causes the projection unit 5 to project the plurality of respective phase pattern images in a predefined order. In a phase shift method (for example, a phase shift method of the related art) which is different from the reformed phase shift method, there is no fixed order in which the projection unit 5 projects a plurality of different phase pattern images.

The three-dimensional shape measurement device 30 calculates a phase of a wave represented by a reference phase pattern image among a plurality of phase pattern images and at each position on a captured image in which the phase pattern image is included on the basis of a captured image obtained by the imaging unit 10 through the projection imaging process. The three-dimensional shape measurement device 30 calculates a corresponding position which is a position corresponding to each position on the captured image and is a position on the reference phase pattern image on the basis of the calculated phase. A method of the three-dimensional shape measurement device 30 calculating a corresponding position on the basis of the phase may be an existing method, and may be a method developed from now on. The three-dimensional shape measurement device 30 measures a three-dimensional shape of the target object O on the basis of the calculated corresponding position. A method of the three-dimensional shape measurement device 30 measuring a three-dimensional shape of the target object O on the basis of the calculated corresponding position may be an existing method, and may be a method developed from now on. As mentioned above, the three-dimensional shape measurement device 30 measures a three-dimensional shape of the target object O according to the reformed phase shift method.

Hereinafter, as an example, a description will be made of a case where the plurality of different phase pattern images are four different phase pattern images. In other words, the three-dimensional shape measurement device 30 measures a three-dimensional shape of the target object O according to the reformed phase shift method (a reformed phase shift method using a four-step method) using the four different phase pattern images. A plurality of different phase pattern images may be three different phase pattern images, and may be five different phase pattern images.

The four different phase pattern images have different phases of waves represented by the respective four phase pattern images. Hereinafter, as an example, a description will be made of a case where the four phase pattern images include a first phase pattern image P1 which is a phase pattern image representing a reference wave, a second phase pattern image P2 which is a phase pattern image representing a wave of which a phase advances by 90 degrees with respect to the wave represented by the first phase pattern image P1, a third phase pattern image P3 which is a phase pattern image representing a wave of which a phase advances by 90 degrees with respect to the wave represented by the second phase pattern image P2, and a fourth phase pattern image P4 which is a phase pattern image representing a wave of which a phase advances by 90 degrees with respect to the wave represented by the third phase pattern image P3. In other words, in a case where a phase of the wave represented by the first phase pattern image P1 is 0 degrees, a phase of the wave represented by the second phase pattern image P2 is π/2. In this case, a phase of the wave represented by the third phase pattern image P3 is n. In this case, a phase of the wave represented by the fourth phase pattern image P4 is 3π/2.

Figure 3:
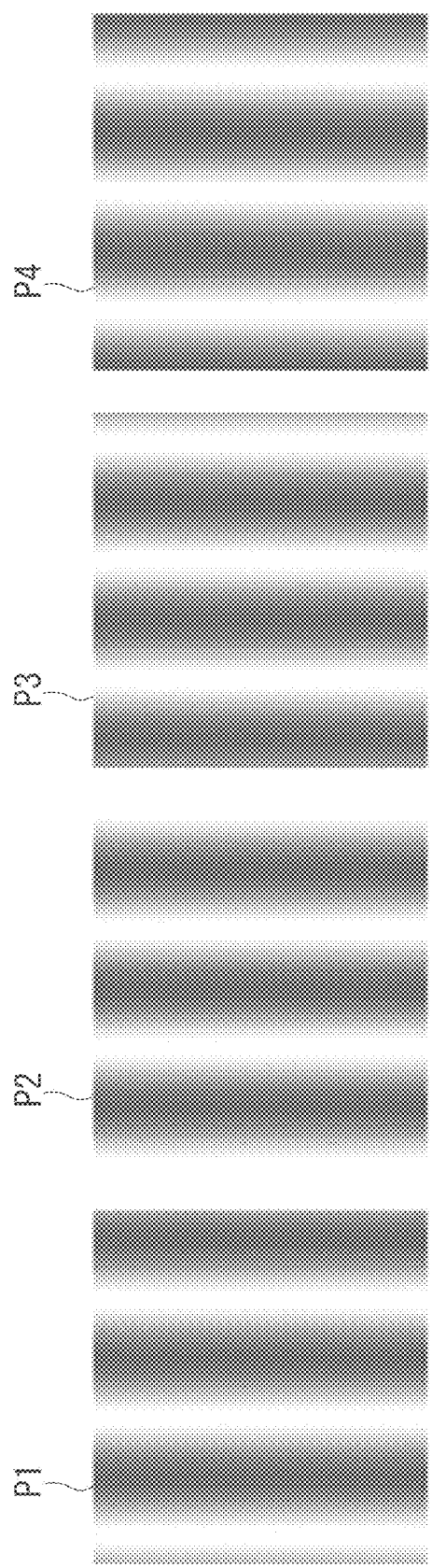
FIG. 3 is a diagram illustrating an example of each of four phase pattern images in a case where the phase pattern images are projected onto a projection region not including a target object.

Here, FIG. 3 is a diagram illustrating an example of each of the four phase pattern images in a case where the phase pattern images are projected onto the projection region R1 not including the target object O. As illustrated in FIG. 3, each of the first phase pattern image P1, the second phase pattern image P2, the third phase pattern image P3, and the fourth phase pattern image P4 which are four phase pattern images represents a wave in which a luminance value on the image periodically changes along a first direction on the image. A phase of the wave represented by the second phase pattern image P2 advances by 90 degrees relative to a phase of the wave represented by the first phase pattern image P1. A phase of the wave represented by the third phase pattern image P3 advances by 90 degrees relative to a phase of the wave represented by the second phase pattern image P2. A phase of the wave represented by the fourth phase pattern image P4 advances by 90 degrees relative to a phase of the wave represented by the third phase pattern image P3. In this case, a phase of the wave represented by the first phase pattern image P1 advances by 90 degrees relative to a phase of the wave represented by the fourth phase pattern image P4.

The wave represented by each of the first phase pattern image P1, the second phase pattern image P2, the third phase pattern image P3, and the fourth phase pattern image P4 is a spatially spreading wave. The wave represented by each of the first phase pattern image P1, the second phase pattern image P2, the third phase pattern image P3, and the fourth phase pattern image P4 may be a temporally spreading wave. In this case, each of the first phase pattern image P1, the second phase pattern image P2, the third phase pattern image P3, and the fourth phase pattern image P4 is correlated with a plurality of phase pattern images in which a luminance value changes whenever time elapses. The three-dimensional shape measurement device 30 sequentially projects each of the first phase pattern image P1, the second phase pattern image P2, the third phase pattern image P3, and the fourth phase pattern image P4, and a plurality of phase pattern images correlated with each of the first phase pattern image P1, the second phase pattern image P2, the third phase pattern image P3, and the fourth phase pattern image P4, onto the projection region R1.

In this example, the wave represented by each of the first phase pattern image P1, the second phase pattern image P2, the third phase pattern image P3, and the fourth phase pattern image P4 is a plane wave advancing along the first direction, but may be a spherical wave instead thereof.

In the reformed phase shift method using a four-step method, the three-dimensional shape measurement device 30 causes the projection unit 5 to project the four phase pattern images including the first phase pattern image P1, the second phase pattern image P2, the third phase pattern image P3, and the fourth phase pattern image P4 onto the projection region R1 including the target object O in a predefined order.

Here, the reformed phase shift method will be described more in detail. In the reformed phase shift method using a four-step method, the three-dimensional shape measurement device 30 selects, as a target phase pattern image, the first phase pattern image P1, the second phase pattern image P2, the third phase pattern image P3, and the fourth phase pattern image P4 one by one in a predefined order. The three-dimensional shape measurement device 30 causes the projection unit 5 to project the selected target phase pattern image onto the projection region R1 including the target object O, and then causes the imaging unit 10 to image the imaging region R2 including the target object O onto which the target phase pattern image is projected. Consequently, the three-dimensional shape measurement device 30 acquires, from the imaging unit 10, a first captured image C1 which is a captured image in which the target object O onto which the first phase pattern image P1 is projected is imaged, a second captured image C2 which is a captured image in which the target object O onto which the second phase pattern image P2 is projected is imaged, a third captured image C3 which is a captured image in which the target object O onto which the third phase pattern image P3 is projected is imaged, and a fourth captured image C4 which is a captured image in which the target object O onto which the fourth phase pattern image P4 is projected is imaged. In this example, each position on a captured image obtained by the imaging unit 10, such as each of the first captured image C1 to the fourth captured image C4, is represented by a coordinate in the imaging unit coordinate system indicating a position on the captured image.

In the reformed phase shift method, the three-dimensional shape measurement device 30 calculates a phase at each position on the first captured image C1 which is a captured image in which the first phase pattern image P1 as a reference phase pattern image is imaged among the first captured image C1 to the fourth captured image C4. Specifically, in the phase shift method, the three-dimensional shape measurement device 30 calculates a phase $\phi(x,y)$ at the position on the first captured image C1, indicated by the coordinate $(x,y)$ on the basis of a luminance value $I_1(x,y)$ at a position on the first captured image C1, indicated by a coordinate $(x,y)$ in the imaging unit coordinate system, a luminance value $I_2(x,y)$ at a position on the second captured image C2, indicated by the coordinate $(x,y)$ in the imaging unit coordinate system, a luminance value $I_3(x,y)$ at a position on the third captured image C3, indicated by the coordinate $(x,y)$ in the imaging unit coordinate system, a luminance value $I_4(x,y)$ at a position on the fourth captured image C4, indicated by the coordinate $(x,y)$ in the imaging unit coordinate system, and the following Equation (1).

$$\theta(x, y) = \tan^{-1} \frac{I_4(x, y) - I_2(x, y)}{I_1(x, y) - I_3(x, y)} \qquad (1)$$

Here, as illustrated in FIG. 3, since the wave represented by each of the first phase pattern image P1 to the fourth phase pattern image P4 has periodicity, in a case where the luminance of light applied from the light source of the projection unit 5 does not temporally change, average luminance values of the first phase pattern image P1 to the fourth phase pattern image P4 are substantially the same as each other. An average luminance value of the first phase pattern image P1 is an average value of luminance values at the respective positions on the first phase pattern image P1. An average luminance value of the second phase pattern image P2 is an average value of luminance values at the respective positions on the second phase pattern image P2. An average luminance value of the third phase pattern image P3 is an average value of luminance values at the respective positions on the third phase pattern image P3. An average luminance value of the fourth phase pattern image P4 is an average value of luminance values at the respective positions on the fourth phase pattern image P4.

On the other hand, in a case where the luminance of light applied from the light source of the projection unit 5 temporally changes, average luminance values of the first phase pattern image P1 to the fourth phase pattern image P4 are different from each other. In other words, in a case where the luminance of light applied from the light source of the projection unit 5 temporally changes, each of $I_1(x,y)$, $I_2(x,y)$, $I_3(x,y)$, and $I_4(x,y)$ which are four luminance values included in the denominator and the numerator in the above Equation (1) also changes due to the change in the luminance. This indicates that an error increases in a case where the luminance temporally changes. In order to minimize the increase in the error, when the three-dimensional shape measurement device 30 causes the projection unit 5 to project the four phase pattern images, a target phase pattern image is selected from among the four phase pattern images one by one in a predefined order, and the projection unit 5 projects the selected target phase pattern image. The predefined order is an order according to the above Equation (1), that is, an equation indicating a correspondence relationship between a phase of a wave represented by the reference phase pattern image on a captured image in which the phase pattern image is imaged, and luminance values on four captured images in which the respective four phase pattern images are imaged.

Figure 4:
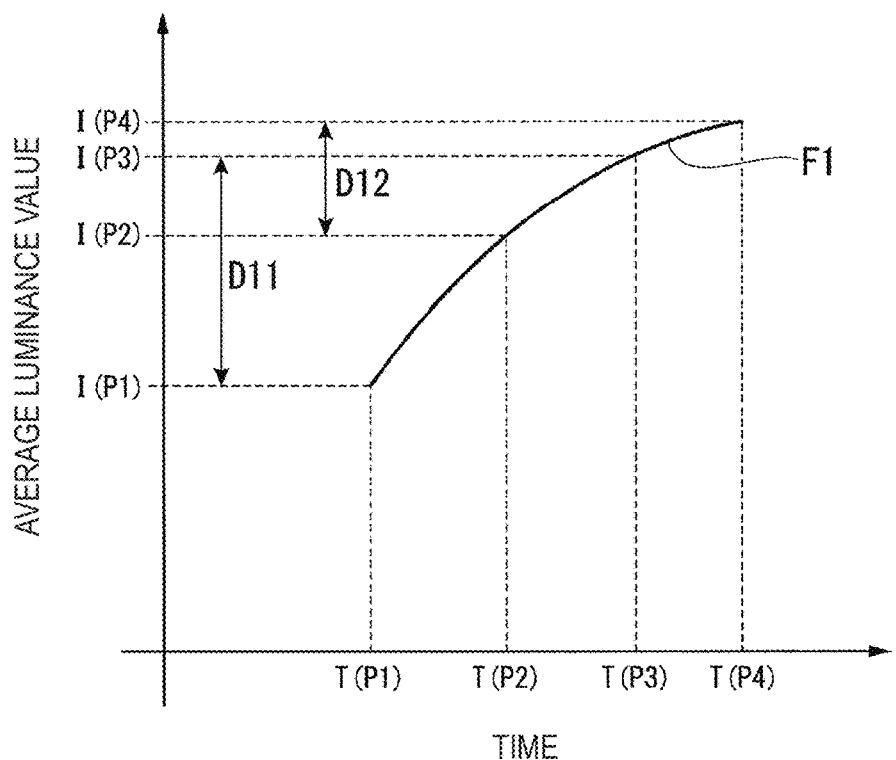
FIG. 4 is a graph illustrating a temporal change of an average luminance value of the respective four phase pattern images in a case where the luminance of light applied from a light source included in a projection unit temporally changes.

Here, with reference to FIGS. 4 and 5, a description will be made of the predefined order in the reformed phase shift method. FIG. 4 is a graph illustrating a temporal change of an average luminance value of each of the four phase pattern images in a case where the luminance of light applied from the light source of the projection unit 5 temporally changes. A transverse axis of the graph in FIG. 4 expresses elapsed time after the light source of the projection unit 5 starts to apply light. A longitudinal axis of the graph expresses average luminance values of the respective four phase pattern images. A curve F1 illustrated in FIG. 4 is a curve indicating a temporal change in an average luminance value of the first phase pattern image P1. In FIG. 4, curves indicating temporal changes in respective average luminance values of the second phase pattern image P2 to the fourth phase pattern image P4 substantially overlap the curve indicating a temporal change in an average luminance value of the first phase pattern image P1, and are thus replaced with the curve F1.

In the example illustrated in FIG. 4, in a case where the three-dimensional shape measurement device 30 causes the projection unit 5 to project the first phase pattern image P1 at a timing T(P1) illustrated in FIG. 4, an average luminance value of the first phase pattern image P1 is I(P1). In this example, in a case where the three-dimensional shape measurement device 30 causes the projection unit 5 to project the second phase pattern image P2 at a timing T(P2) illustrated in FIG. 4, an average luminance value of the second phase pattern image P2 is I(P2). The timing T(P2) is a timing later than the timing T(P1). I(P2) is a value greater than I(P1). In this example, in a case where the three-dimensional shape measurement device 30 causes the projection unit 5 to project the third phase pattern image P3 at a timing T(P3) illustrated in FIG. 4, an average luminance value of the third phase pattern image P3 is I(P3). The timing T(P3) is a timing later than the timing T(P2). I(P3) is a value greater than I(P2). In this example, in a case where the three-dimensional shape measurement device 30 causes the projection unit 5 to project the fourth phase pattern image P4 at a timing T(P4) illustrated in FIG. 4, an average luminance value of the fourth phase pattern image P4 is I(P4). The timing T(P4) is a timing later than the timing T(P3). I(P4) is a value greater than I(P3). In FIG. 4, a difference between I(P1) and I(P3) is indicated by D11. In FIG. 4, a difference between I(P2) and I(P4) is indicated by D12.

As the difference D11 becomes smaller, an error included in the denominator in the above Equation (1) is reduced. As the difference D12 becomes smaller, an error included in the numerator in the above Equation (1) is reduced.

Therefore, in the reformed phase shift method, the three-dimensional shape measurement device 30 sets an order of the projection unit 5 projecting the four phase pattern images to an order which is different from the order illustrated in FIG. 4, and causes the projection unit 5 to project the four phase pattern images in the order. As illustrated in FIG. 5, the three-dimensional shape measurement device 30 replaces the timing T(P2) illustrated in FIG. 4 with the timing T(P3) illustrated in FIG. 4, and can thus reduce the error included in the denominator in the above Equation (1) and the error included in the numerator in the above Equation (1).

Figure 5:
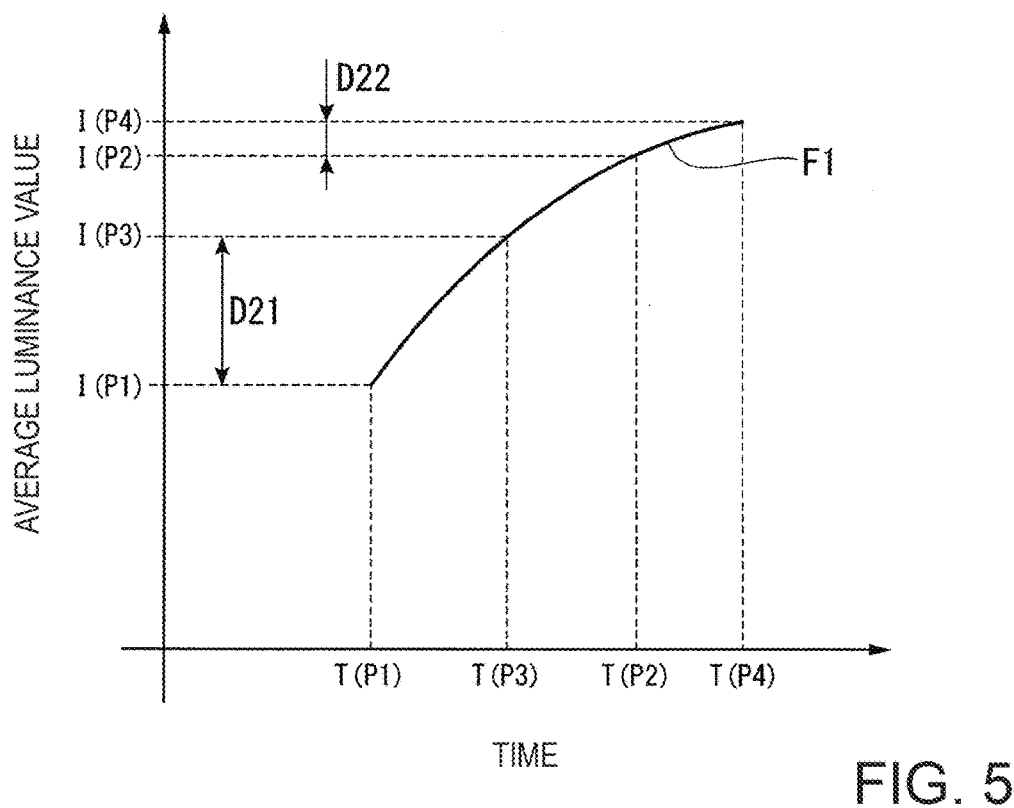
FIG. 5 is a graph illustrating a case of changing an order of timings at which the respective four phase pattern images are projected by the projection unit in the graph of FIG. 4.

FIG. 5 is a graph in a case of changing an order of timings at which the projection unit 5 projects the four phase pattern images in the graph in FIG. 4. In FIG. 5, a difference between I(P1) and I(P3) is indicated by D21. D21 is a value smaller than D11. In FIG. 5, a difference between I(P2) and I(P4) is indicated by D22. D22 is a value smaller than D12. In other words, the three-dimensional shape measurement system 1 causes the projection unit 5 to project the four phase pattern images in an order of the first phase pattern image P1, the third phase pattern image P3, the second phase pattern image P2, and the fourth phase pattern image P4 as a predefined order, and can thus reduce the error included in the denominator in the above Equation (1) and the error included in the numerator in the above Equation (1). In other words, the three-dimensional shape measurement device 30 can reduce such errors occurring when a three-dimensional shape of the target object O is measured by using the reformed phase shift method. As a result, the three-dimensional shape measurement device 30 can omit a waiting time until the luminance of light applied from the light source of the projection unit 5 does not temporally change, and can thus reduce the time required to measure a three-dimensional shape of the target object O.

Here, the order illustrated in FIG. 5 of the projection unit 5 projecting the four phase pattern images is determined according to the above Equation (1), that is, an equation indicating a correspondence relationship between a phase of a wave represented by the reference phase pattern image on a captured image in which the phase pattern image is imaged, and luminance values on four captured images in which the respective four phase pattern images are imaged. Specifically, the order is an order in which the phase pattern images respectively corresponding to the luminance values included in the denominator of the equation are consecutively projected, and the phase pattern images respectively corresponding to the luminance values included in the numerator of the equation are consecutively projected. As in this example, in the reformed phase shift method using a four-step method, the phase pattern images corresponding to the luminance values included in the denominator are the first phase pattern image P1 and the third phase pattern image P3. In the reformed phase shift method, the phase pattern images corresponding to the luminance values included in the numerator are the second phase pattern image P2 and the fourth phase pattern image P4. Thus, the three-dimensional shape measurement device 30 sets the order illustrated in FIG. 5 of the projection unit 5 projecting the four phase pattern images to an order of the first phase pattern image P1, the third phase pattern image P3, the second phase pattern image P2, and the fourth phase pattern image P4, and can thus reduce errors occurring when a three-dimensional shape of the target object O is measured. In an n-step method (where n is an integer of 3 or greater excluding 4) excluding the four-step method, an order of the projection unit 5 projecting n phase pattern images is determined according to phase pattern images respectively corresponding to luminance values included in a numerator and a denominator of the equation in the n-step method.

The three-dimensional shape measurement system 1 may cause the projection unit 5 to project the four phase pattern images in an order of the second phase pattern image P2, the fourth phase pattern image P4, the first phase pattern image P1, and the third phase pattern image P3 as the predefined order. The three-dimensional shape measurement system 1 may cause the projection unit 5 to project the four phase pattern images in an order of the second phase pattern image P2, the fourth phase pattern image P4, the third phase pattern image P3, and the first phase pattern image P1 as the predefined order. The three-dimensional shape measurement system 1 may cause the projection unit 5 to project the four phase pattern images in an order of the fourth phase pattern image P4, the second phase pattern image P2, the first phase pattern image P1, and the third phase pattern image P3 as the predefined order. The three-dimensional shape measurement system 1 may cause the projection unit 5 to project the four phase pattern images in an order of the fourth phase pattern image P4, the second phase pattern image P2, the third phase pattern image P3, and the first phase pattern image P1 as the predefined order. The three-dimensional shape measurement system 1 may cause the projection unit 5 to project the four phase pattern images in an order of the third phase pattern image P3, the first phase pattern image P1, the second phase pattern image P2, and the fourth phase pattern image P4 as the predefined order. The three-dimensional shape measurement system 1 may cause the projection unit 5 to project the four phase pattern images in an order of the third phase pattern image P3, the first phase pattern image P1, the fourth phase pattern image P4, and the second phase pattern image P2 as the predefined order. The three-dimensional shape measurement system 1 may cause the projection unit 5 to project the four phase pattern images in an order of the first phase pattern image P1, the third phase pattern image P3, the fourth phase pattern image P4, and the second phase pattern image P2 as the predefined order.

Functional Configuration of Three-Dimensional Shape Measurement Device

Figure 6:
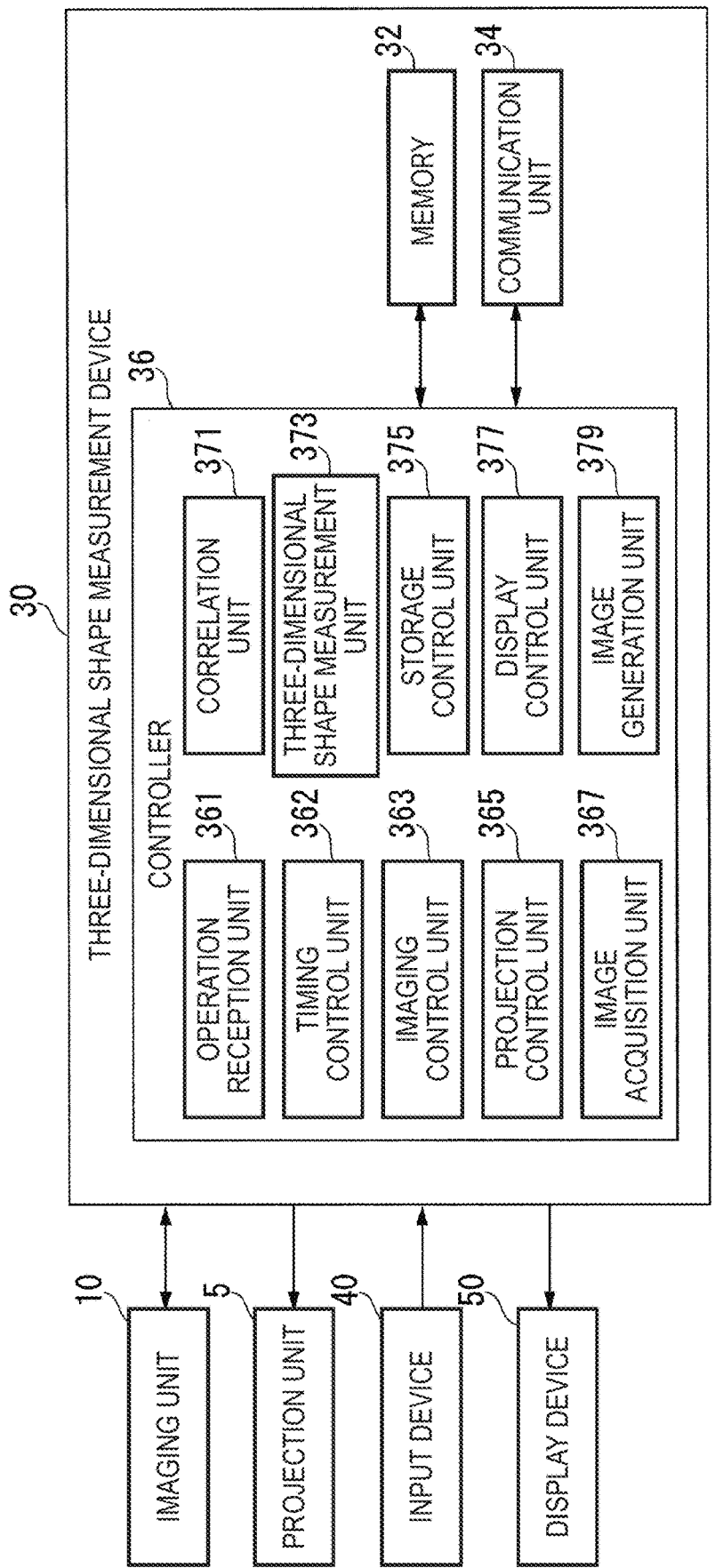
FIG. 6 is a diagram illustrating an example of a functional configuration of the three-dimensional shape measurement device.

Hereinafter, with reference to FIG. 6, a description will be made of a functional configuration of the three-dimensional shape measurement device 30. FIG. 6 is a diagram illustrating an example of a functional configuration of the three-dimensional shape measurement device 30.

The three-dimensional shape measurement device 30 includes the memory 32, the communication unit 34, and a controller 36.

The controller 36 controls the entire three-dimensional shape measurement device 30. The controller 36 includes an operation reception unit 361, a timing control unit 362, an imaging control unit 363, a projection control unit 365, an image acquisition unit 367, a correlation unit 371, a three-dimensional shape measurement unit 373, a storage control unit 375, a display control unit 377, and an image generation unit 379. The functional units included in the controller 36 are realized, for example, by the processor 31 executing various commands such as the commands 321 and 322 stored in the memory 32. Some or all of the functional units may be hardware functional units such as a large scale integration (LSI) or an application specific integrated circuit (ASIC).

The operation reception unit 361 receives an operation from a user via the input device 40. The operation reception unit 361 receives a request from other devices as an operation on the three-dimensional shape measurement device 30.

The timing control unit 362 controls projection timings at which the projection unit 5 projects a plurality of phase pattern images generated by the image generation unit 379 which will be described later and imaging timings at which the imaging unit 10 images the plurality of phase pattern images projected by the projection unit 5.

The imaging control unit 363 causes the imaging unit 10 to image the imaging region R2 which can be imaged by the imaging unit 10.

The projection control unit 365 causes the projection unit 5 to project a projection image onto the projection region R1 onto which the projection image can be projected.

The image acquisition unit 367 acquires a captured image obtained by the imaging unit 10 from the imaging unit 10.

The correlation unit 371 calculates a phase of a wave represented by the first phase pattern image P1 which is a reference phase pattern image and at each position on the first captured image C1 in which the first phase pattern image P1 is imaged on the basis of each of the first captured image C1 to the fourth captured image C4 among captured images acquired by the image acquisition unit 367 from the imaging unit 10. The correlation unit 371 calculates the corresponding position on the basis of the calculated phase.

The three-dimensional shape measurement unit 373 measures a three-dimensional shape of the target object O according to, for example, triangulation on the basis of the corresponding position calculated by the correlation unit 371. The three-dimensional shape measurement unit 373 may measure a three-dimensional shape of the target object O according to other methods based on the corresponding position.

The storage control unit 375 stores a measurement result in the three-dimensional shape measurement unit 373 in the memory 32. The storage control unit 375 may store the measurement result in a memory of another device which is communicably connected to the three-dimensional shape measurement device 30, or a memory of an information processing device on a cloud.

The display control unit 377 generates various images to be displayed on the display device 50. The display control unit 377 displays the generated images on the display device 50.

The image generation unit 379 generates a plurality of phase pattern images in response to an operation received from the operation reception unit 361.

Figure 7:
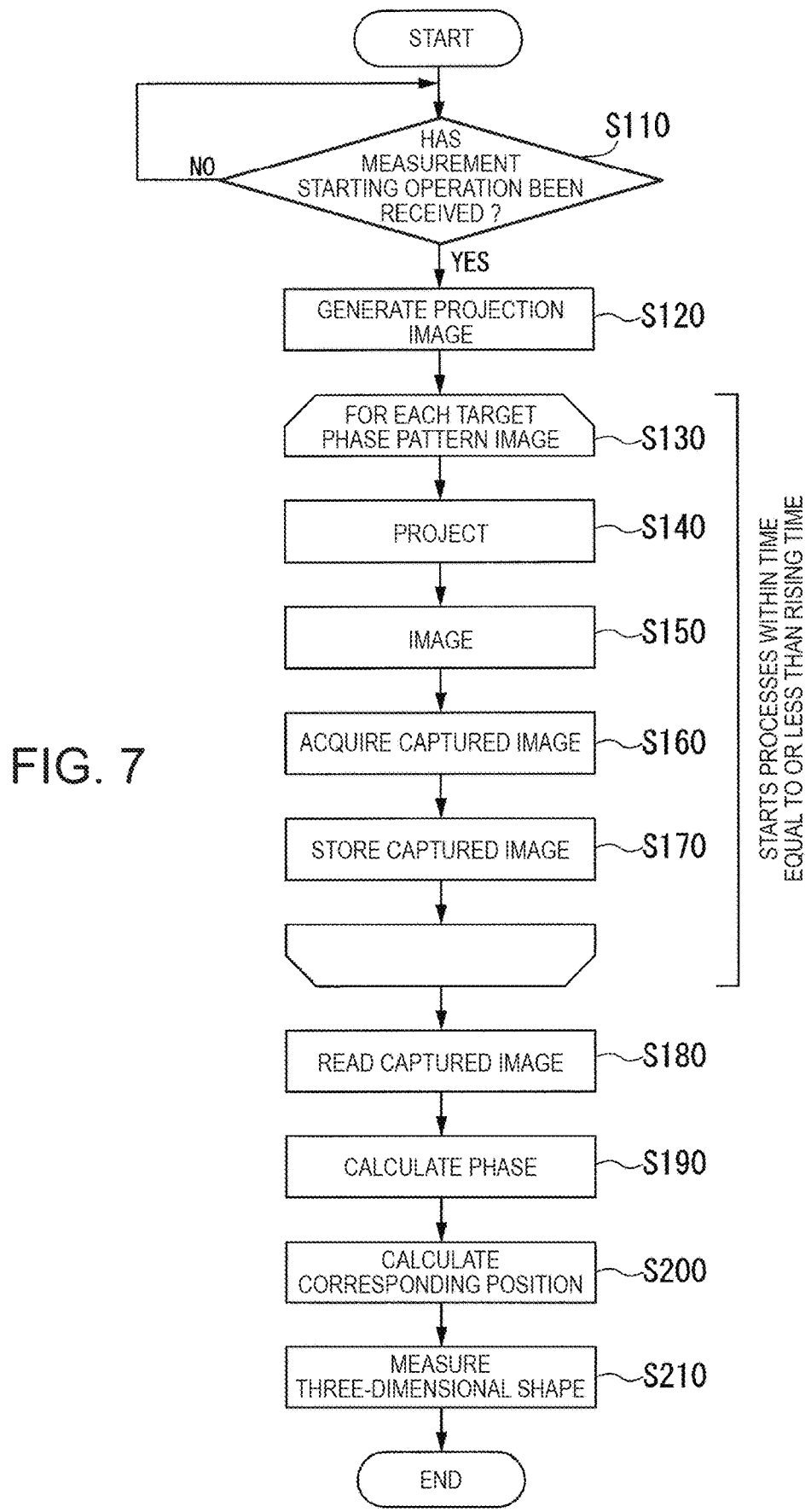
FIG. 7 is a flowchart illustrating an example of a flow of a process in which the three-dimensional shape measurement device measures a three-dimensional shape of the target object.

Process of Three-Dimensional Shape Measurement Device Measuring Three-Dimensional Shape of Target Object Hereinafter, with reference to FIG. 7, a description will be made of a process in which the three-dimensional shape measurement device 30 measures a three-dimensional shape of the target object O. FIG. 7 is a flowchart illustrating an example of a flow of a process in which the three-dimensional shape measurement device 30 measures a three-dimensional shape of the target object O. In a description of FIG. 7, a process performed by each functional unit of the controller 36 illustrated in FIG. 6 is a process performed by the processor 31 of the information processing device PC1.

The operation reception unit 361 waits for a measurement starting operation which is an operation of starting a process of measuring a three-dimensional shape of the target object O to be received via the input device 40 (step S110). For example, the operation reception unit 361 receives the measurement starting operation from the user via an operation screen which is displayed in advance on the display device 50 by the display control unit 377. In a case where the operation reception unit 361 determines that the measurement starting operation has been received via the input device 40 (YES in step S110), the image generation unit 379 generates the four phase pattern images, that is, the first phase pattern image P1 to the fourth phase pattern image P4 (step S120). The first phase pattern image P1 to the fourth phase pattern image P4 may be stored in the memory 32 in advance. In this case, the storage control unit 375 stores the first phase pattern image P1 to the fourth phase pattern image P4 in the memory 32 in response to an operation from the user at a timing before the process in step S110 is performed. In step S110, the operation reception unit 361 may wait for the measurement starting operation to be received from another device. Another device is, for example, the information processing device PC2 or the information processing device PC3 illustrated in FIG. 2. The storage control unit 375 may store the first phase pattern image P1 to the fourth phase pattern image P4 in a memory of another device or a memory of an information processing device on a cloud in response to an operation from the user at a timing before the process in step S110 is performed.

Next, the projection control unit 365 selects the four phase pattern images generated in step S120 in the order illustrated in FIG. 5, that is, in the order of the first phase pattern image P1, the third phase pattern image P3, the second phase pattern image P2, and the fourth phase pattern image P4 one by one as a target phase pattern image (step S130). Each of the projection control unit 365, the imaging control unit 363, the timing control unit 362, the image acquisition unit 367, and the storage control unit 375 repeatedly performs the processes in steps S140 to S170. In this case, the projection control unit 365 causes the light source of the projection unit 5 to apply light at a timing before the process in step S140 performed for the first time is started among the repeatedly performed processes in steps S140 to S170. However, each of the projection control unit 365, the imaging control unit 363, the timing control unit 362, the image acquisition unit 367, and the storage control unit 375 starts the process in step S140 performed for the first time during the time until the rising time elapses after the light source starts to apply light.

After the target phase pattern image is selected in step S130, the projection control unit 365 causes the projection unit 5 to project the selected target phase pattern image onto the projection region R1 (step S140). Specifically, in step S140, the timing control unit 362 outputs the projection timing among the predefined timings to the projection control unit 365. The projection control unit 365 causes the projection unit 5 to project the target phase pattern image selected in step S130 onto the projection region R1 in response to the projection timing acquired from the timing control unit 362.

Next, the imaging control unit 363 causes the imaging unit 10 to image the imaging region R2 which can be imaged by the imaging unit 10 (step S150). Specifically, in step S150, the timing control unit 362 outputs the imaging timing among the predefined timings to the imaging control unit 363. The imaging control unit 363 causes the imaging unit 10 to image the imaging region R2 in response to the imaging timing acquired from the timing control unit 362. As the time between the projection timing in step S140 and the imaging timing in step S150 which are recently executed is reduced, errors caused by D21 and D22 illustrated in FIG. 5 are reduced.

In a case where the projection control unit 365 controls a projection timing, and the imaging control unit 363 also controls an imaging timing, the three-dimensional shape measurement device 30 may not include the timing control unit 362. The timing control unit 362 may change one or both of a projection timing and an imaging timing in response to an operation received from the user by the operation reception unit 361. In this case, the timing control unit 362 may change one or both of a projection timing and an imaging timing, for example, in the millisecond unit. Consequently, the three-dimensional shape measurement device 30 can more reliably start the projection imaging process until the rising time elapses after the light source of the projection unit 5 starts to apply light.

Next, the image acquisition unit 367 acquires the captured image obtained by the imaging unit 10 in step S150 from the imaging unit 10 (step S160).

Next, the storage control unit 375 stores the captured image acquired by the image acquisition unit 367 in step S160 in the memory 32 (step S170). The storage control unit 375 may store the captured image in a memory of another device or a memory of an information processing device on a cloud.

After the process in step S170 is performed, the projection control unit 365 proceeds to step S130, and selects the next target phase pattern image. In step S130, in a case where there is no phase pattern image which is not selected as a target phase pattern image, the correlation unit 371 proceeds to step S180.

In the above-described way, each of the projection control unit 365, the imaging control unit 363, the timing control unit 362, the image acquisition unit 367, and the storage control unit 375 starts the processes in steps S130 to S170 within a time equal to or less than the rising time after the light source of the projection unit 5 starts to apply light.

After the processes in steps S130 to S170 are repeatedly performed, the correlation unit 371 reads the four captured images stored in the memory 32 from the memory 32 in step S170 which is repeatedly executed (step S180).

Next, the correlation unit 371 calculates a phase at each position on the first captured image C1 which is a captured image in which the first phase pattern image P1 as a reference phase pattern image is imaged on the basis of the four captured images read from the memory 32 in step S180, that is, the first captured image C1 to the fourth captured image C4, and the above Equation (1) (step S190).

Next, the correlation unit 371 calculates the corresponding position on the basis of the phase at each position on the first captured image C1, calculated in step S190 (step S200).

Next, the three-dimensional shape measurement unit 373 measures a three-dimensional shape of the target object O on the basis of the corresponding position calculated in step S200 (step S210). In other words, the three-dimensional shape measurement device 30 generates three-dimensional shape information indicating the three-dimensional shape of the target object O in step S210. The three-dimensional shape measurement unit 373 finishes the process.

As mentioned above, the three-dimensional shape measurement device 30 starts a process (in this example, the projection imaging process) in which each of a plurality of different phase pattern images is projected by a projection unit (in this example, the projection unit 5), and the phase pattern image is imaged by an imaging unit (in this example, the imaging unit 10) whenever each phase pattern image is projected by the projection unit until the rising time elapses, the rising time being a time until the luminance of light does not temporally change after a light source of the projection unit applies the light, and measures a three-dimensional shape of a target object (in this example, the target object O) onto which the phase pattern image is projected on the basis of a captured image obtained by the imaging unit after the process is performed. Consequently, the three-dimensional shape measurement device 30 can reduce the time required to measure a three-dimensional shape of the target object.

The three-dimensional shape measurement device 30 causes the projection unit to project phase pattern images in an order of a first phase pattern image (in this example, the first phase pattern image P1), a third phase pattern image (in this example, the third phase pattern image P3), a second phase pattern image (in this example, the second phase pattern image P2), and a fourth phase pattern image (in this example, the fourth phase pattern image P4). Consequently, the three-dimensional shape measurement device 30 can reduce an error and can also reduce the time required to measure a three-dimensional shape of the target object on the basis of the first phase pattern image, the second phase pattern image, the third phase pattern image, and the fourth phase pattern image which are projected by the projection unit in the order of the first phase pattern image, the third phase pattern image, the second phase pattern image, and the fourth phase pattern image.

The three-dimensional shape measurement device 30 receives an operation, generates a plurality of phase pattern images in response to a received operation, controls a projection timing at which the projection unit projects each of the plurality of generated phase pattern images and an imaging timing at which the imaging unit images each of the phase pattern images projected by the projection unit, causes the projection unit to project each of the plurality of generated phase pattern images according to the controlled projection timing, causes the imaging unit to image each phase pattern image according to the controlled imaging timing, and measures a three-dimensional shape of the target object on the basis of a captured image obtained by the imaging unit. Consequently, the three-dimensional shape measurement device 30 can reduce the time required to measure a three-dimensional shape of the target object on the basis of the projection timing and the imaging timing.

The three-dimensional shape measurement device 30 receives an operation from the user. Consequently, the three-dimensional shape measurement device 30 can reduce the time required to measure a three-dimensional shape of the target object according to the operation received from the user.

The three-dimensional shape measurement device 30 receives a request from another device as the operation. Consequently, the three-dimensional shape measurement device 30 can reduce the time required to measure a three-dimensional shape of the target object according to the operation received from another device.

The three-dimensional shape measurement device 30 measures a three-dimensional shape of a target object onto which a phase pattern image is projected by using a phase shift method (in this example, the reformed phase shift method) based on a captured image obtained by the imaging unit. Consequently, the three-dimensional shape measurement device 30 can reduce the time required to measure a three-dimensional shape of the target object according to the phase shift method.

Modification Example 1 of Embodiment

Hereinafter, with reference to FIGS. 8 and 9, a description will be made of Modification Example 1 of the embodiment. In Modification Example 1 of the embodiment, the same constituent elements as in the embodiment are given the same reference numerals, and description thereof will be omitted.

Figure 8:
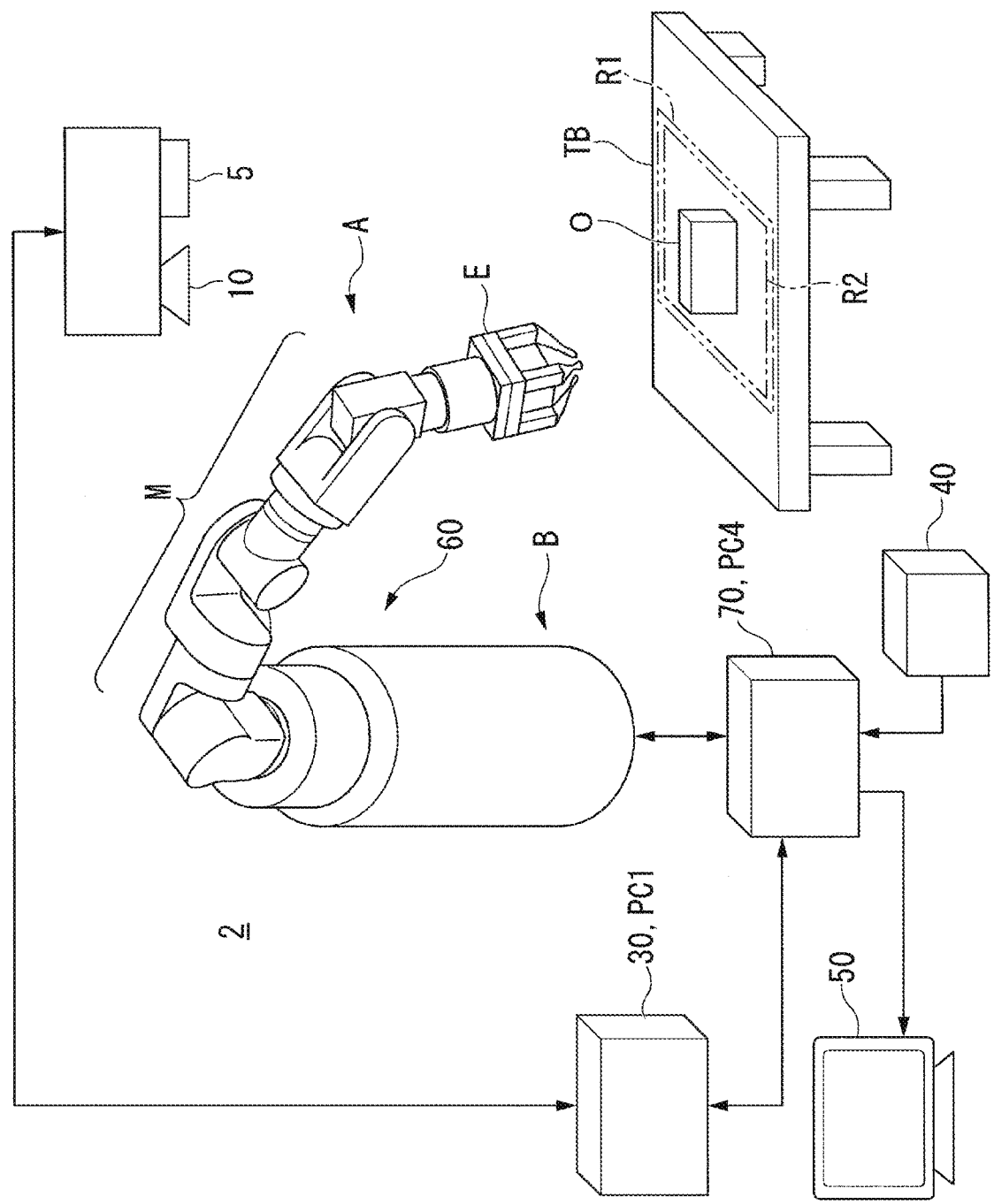
FIG. 8 is a configuration diagram illustrating an example of a robot system according to Modification Example 1 of the embodiment.
Figure 9:
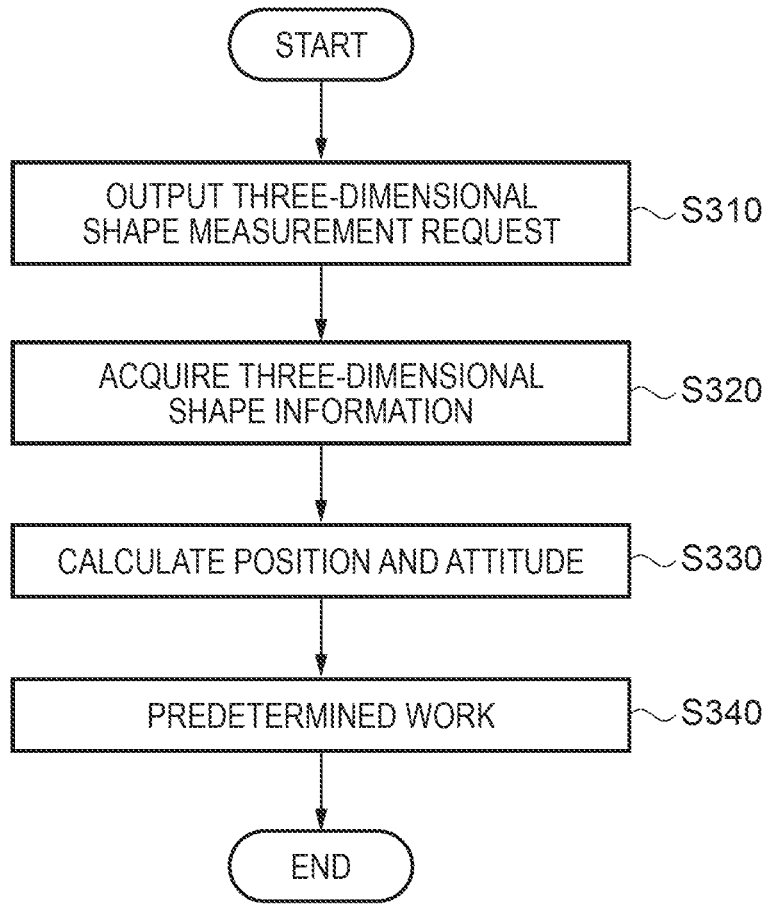
FIG. 9 is a flowchart illustrating an example of a flow of a process in which a robot control device causes a robot to perform predetermined work.

FIG. 8 is a configuration diagram illustrating an example of a robot system 2 according to Modification Example 1 of the embodiment. In Modification Example 1 of the embodiment, the three-dimensional shape measurement device 30 described in the embodiment is included in the robot system 2. More specifically, the robot system 2 includes a projection unit 5, an imaging unit 10, a three-dimensional shape measurement device 30, an input device 40, a display device 50, a robot 60, and a robot control device 70. In the robot system 2, the three-dimensional shape measurement device 30 is communicably connected to the robot control device 70 in a wireless or wired manner. In the robot system 2, the three-dimensional shape measurement device 30 measures a three-dimensional shape of the target object O in response to a request from the robot control device 70. The robot control device 70 moves the robot 60 on the basis of the three-dimensional shape of the target object O measured by the three-dimensional shape measurement device 30.

Configuration of Robot System

Hereinafter, with reference to FIG. 8, a description will be made of a configuration of the robot system 2.

In this example, the three-dimensional shape measurement device 30 measures a three-dimensional shape of the target object O in response to a request from the robot control device 70.

In this example, the input device 40 is communicably connected to the robot control device 70 in a wireless or wired manner instead of the three-dimensional shape measurement device 30.

In this example, the display device 50 is communicably connected to the robot control device 70 in a wireless or wired manner instead of the three-dimensional shape measurement device 30.

The robot 60 is a single-arm robot including a movable portion A and a support base B supporting the movable portion A. The single-arm robot is a robot having a single arm such as the movable portion A in this example. Instead of the single-arm robot, the robot 60 may be a multi-arm robot, may be a linear motion robot such as a gantry robot, may be a scalar robot, and may be other robots. The multi-arm robot is a robot having two or more arms (for example, two or more movable portions A). Among multi-arm robots, a robot having two arms is also referred to as a double-arm robot. In other words, the robot 60 may be a double-arm robot having two arms, and may be a multi-arm robot having three or more arms (for example, three or more movable portions A).

The movable portion A includes an end effector E and a manipulator M.

The end effector E is an end effector holding an object. In this example, the end effector E has finger portions, and holds an object by pinching the object between the finger portions. Alternatively, the end effector E may hold an object by lifting the object by using air suction, magnetic force, or other tools. In other words, in this example, holding an object indicates a state in which the object can be lifted.

The end effector E is communicably connected to the robot control device 70 via a cable. Consequently, the end effector E performs an operation based on a control signal acquired from the robot control device 70. Wired communication using the cable is performed on the basis of a standard such as Ethernet (registered trademark) or a USB. The end effector E may be connected to the robot control device 70 through wireless communication performed on the basis of a communication standard such as Wi-Fi (registered trademark).

The manipulator M has six joints. Each of the six joints has an actuator (not illustrated). In other words, the movable portion A including the manipulator M is a six-axis vertical articulated arm. Alternatively, the movable portion A may be a six-axis horizontal articulated arm. The movable portion A performs an operation with a six-axis degree of freedom through cooperative operations among the support base B, the end effector E, the manipulator M, and the actuators of the six joints provided in the manipulator M. The movable portion A may be operated with a degree of freedom of five or less axes, and may be operated with a degree of freedom of seven or more axes.

Each of the six actuators (respective provided in the joints) of the manipulator M is communicably connected to the robot control device 70 via a cable. Consequently, the actuators operate the manipulator M on the basis of control signals acquired from the robot control device 70. Wired communication using the cable is performed on the basis of a standard such as Ethernet (registered trademark) or a USB. Some or all of the six actuators of the manipulator M may be connected to the robot control device 70 through wireless communication performed on the basis of a communication standard such as Wi-Fi (registered trademark).

The robot 60 may include one or both of the projection unit 5 and the imaging unit 10.

The robot control device 70 is formed of at least one processor and at least one memory. In the robot control device 70, at least one processor may be provided in a single device, and may be distributed and provided in a plurality of information processing devices. In the robot control device 70, at least one memory may be provided in a single device, and may be distributed and provided in a plurality of information processing devices.

In the example illustrated in FIG. 8, the robot control device 70 is formed of a single processor provided in an information processing device PC4 and a single memory provided in the information processing device PC4. The information processing device PC4 may include other processors in addition to the processor, and may include other memories in addition to the memory.

The processor of the robot control device 70 is, for example, a CPU. The processor may be other processors such as an FPGA. The processor of the robot control device 70 executes various commands stored in the memory of the robot control device 70. The processor executes various commands stored in a memory of another device.

The memory of the robot control device 70 includes, for example, an HDD, an SSD, an EEPROM, a ROM, and a RAM. In other words, the memory includes a transitory storage device and a non-transitory storage device. Instead of being built into the information processing device PC4, the memory may be an externally attached storage device connected thereto via a digital input/output port such as a USB. The memory stores various pieces of information processed by the processor of the robot control device 70 or processors of other devices, various commands (for example, programs or codes) which can be executed by a computer, and various images.

The robot control device 70 may be formed of some or all of a plurality of information processing devices instead of the information processing device PC4 including the single processor and the single memory. A hardware configuration of the robot control device 70 in a case where the three-dimensional shape measurement device 30 is formed of a plurality of information processing devices is the same as a hardware configuration in a case where the information processing device PC1 illustrated in FIG. 2 is replaced with the information processing device PC4, and thus description thereof will be omitted.

The robot control device 70 includes a communication unit as a hardware functional unit in order to perform communication with other devices.

The communication unit is configured to include a digital input/output port such as a USB, an Ethernet (registered trademark) port, and the like.

The robot control device 70 causes the three-dimensional shape measurement device 30 to measure a three-dimensional shape of the target object O in response to an operation received from the user or an operation received from another device. The robot control device 70 acquires three-dimensional shape information indicating the three-dimensional shape of the target object O generated by the three-dimensional shape measurement device 30 from the three-dimensional shape measurement device 30. The robot control device 70 calculates a position and an attitude of the target object O in the robot coordinate system on the basis of the acquired three-dimensional shape information. The robot control device 70 causes the robot 60 to perform predetermined work on the basis of the calculated position and attitude of the target object O. The predetermined work is, for example, work of the robot 60 holding the target object O. Alternatively, the predetermined work may be other work regarding the target object O.

The robot control device 70 may be integrally formed with the three-dimensional shape measurement device 30. The robot control device 70 may be built into the robot 60.

Process in which Robot Control Device Causes Robot to Perform Predetermined Work Hereinafter, with reference to FIG. 9, a description will be made of a process in which the robot control device 70 causes the robot 60 to perform predetermined work. FIG. 9 is a diagram illustrating an example of a flow of a process in which the robot control device 70 causes the robot 60 to perform predetermined work.

The robot control device 70 outputs a three-dimensional shape measurement request which is a request for causing the three-dimensional shape measurement device 30 to measure a three-dimensional shape of the target object O, to the three-dimensional shape measurement device 30 (step S310). For example, the robot control device 70 receives an operation of outputting the three-dimensional shape measurement request to the three-dimensional shape measurement device 30 from the user via a robot operation screen which is displayed on the display device 50 in advance by the robot control device 70. The robot control device 70 outputs the three-dimensional shape measurement request to the three-dimensional shape measurement device 30 in response to the received request. The operation reception unit 361 of the three-dimensional shape measurement device 30 having received the three-dimensional shape measurement request determines that a measurement starting operation has been received in step S110 illustrated in FIG. 7. The three-dimensional shape measurement unit 373 performs the processes in steps S120 to S210 so as to measure a three-dimensional shape of the target object O.

Next, the robot control device 70 acquires three-dimensional shape information indicating the three-dimensional shape of the target object O generated by the three-dimensional shape measurement device 30 in response to the three-dimensional shape measurement request output in step S310, from the three-dimensional shape measurement device 30 (step S320).

Next, the robot control device 70 calculates a position and an attitude of the target object O in the robot coordinate system on the basis of the three-dimensional shape information acquired in step S320 (step S330). A method of calculating a position and an attitude of the target object in the robot coordinate system on the basis of the three-dimensional shape information may be an existing method, and may be a method developed from now on.

Next, the robot control device 70 causes the robot 60 to perform predetermined work on the basis of the position and the attitude calculated in step S330 (step S340), and finishes the process.

As mentioned above, the robot system 2 starts a process (in this example, the projection imaging process) in which each of a plurality of different phase pattern images is projected by a projection unit (in this example, the projection unit 5), and the phase pattern image is imaged by an imaging unit (in this example, the imaging unit 10) whenever each phase pattern image is projected by the projection unit until the rising time elapses, the rising time being a time until the luminance of light does not temporally change after a light source of the projection unit applies the light, and measures a three-dimensional shape of a target object (in this example, the target object O) onto which the phase pattern image is projected on the basis of a captured image obtained by the imaging unit after the process is performed. Consequently, the robot system 2 can reduce the time required for work performed by a robot (in this example, the robot 60).

Modification Example 2 of Embodiment

Hereinafter, with reference to FIG. 10, a description will be made of Modification Example 2 of the embodiment. In Modification Example 2 of the embodiment, the same constituent elements as in the embodiment and Modification Example 1 of the embodiment are given the same reference numerals, and description thereof will be omitted.

Figure 10:
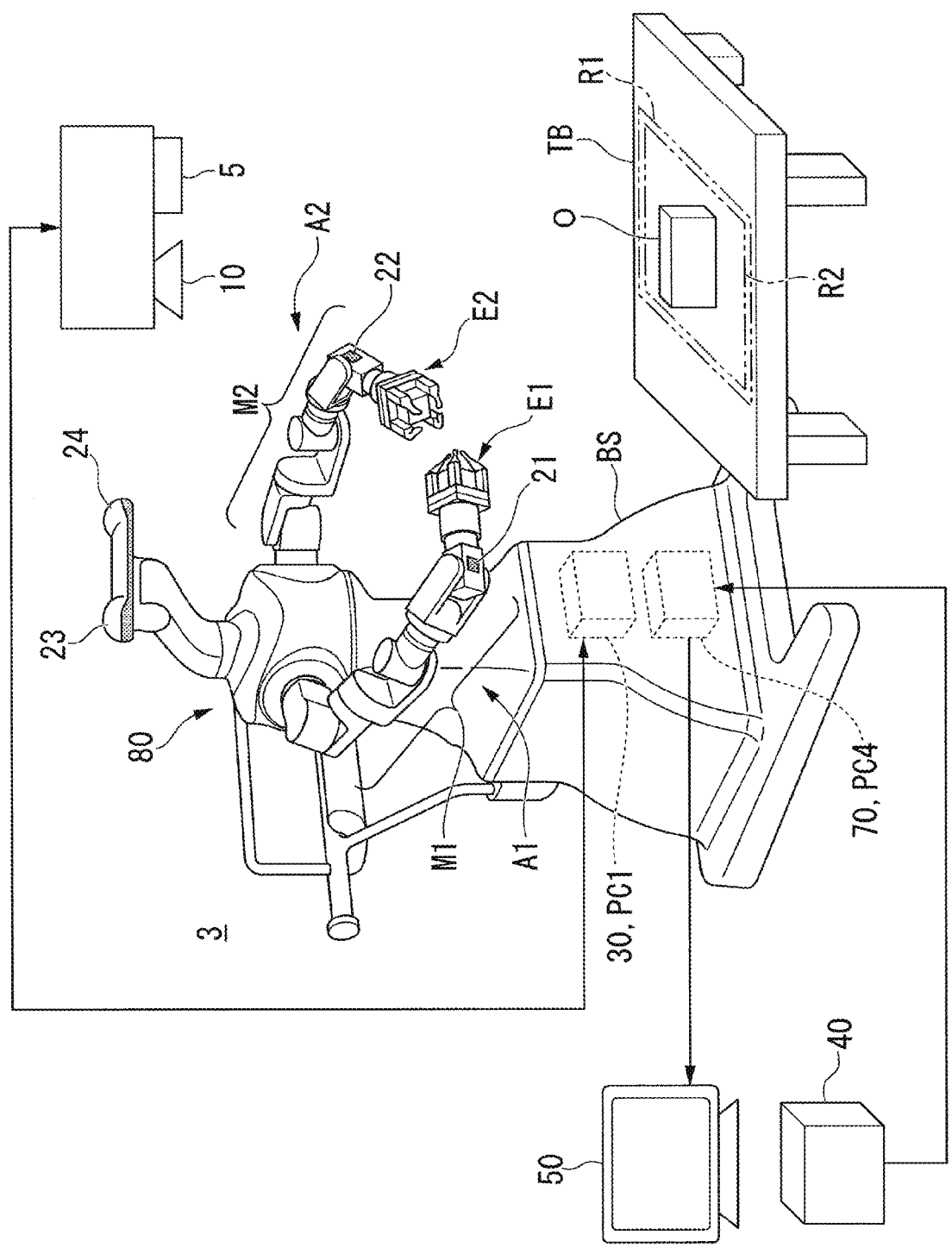
FIG. 10 is a configuration diagram illustrating an example of a robot system according to Modification Example 2 of the embodiment.

FIG. 10 is a configuration diagram illustrating an example of a robot system 3 according to Modification Example 2 of the embodiment. In Modification Example 2 of the embodiment, the three-dimensional shape measurement device 30 described in the embodiment is included in the robot system 3. More specifically, the robot system 3 includes a projection unit 5, an imaging unit 10, a three-dimensional shape measurement device 30, an input device 40, a display device 50, a robot control device 70, and a robot 80. In the robot system 3, the three-dimensional shape measurement device 30 is communicably connected to the robot control device 70 in a wireless or wired manner, and is built into the robot 80 along with the robot control device 70. In the robot system 3, the three-dimensional shape measurement device 30 measures a three-dimensional shape of the target object O in response to a request from the robot control device 70. The robot control device 70 moves the robot 80 on the basis of the three-dimensional shape of the target object O measured by the three-dimensional shape measurement device 30. The robot system 3 may not include some or all of the imaging unit 10, the input device 40, and the display device 50.

Configuration of Robot System

Hereinafter, with reference to FIG. 10, a description will be made of a configuration of the robot system 3.

In this example, the three-dimensional shape measurement device 30 measures a three-dimensional shape of the target object O in response to a request from the robot control device 70.

In this example, the input device 40 is communicably connected to the robot control device 70 in a wireless or wired manner instead of the three-dimensional shape measurement device 30.

In this example, the display device 50 is communicably connected to the robot control device 70 in a wireless or wired manner instead of the three-dimensional shape measurement device 30.

The robot 80 is a double-arm robot including a first arm A1, a second arm A2, a support base BS supporting the first arm A1 and the second arm A2, and the three-dimensional shape measurement device 30 inside the support base BS along with the robot control device 70.

The support base BS is divided into two portions along a direction orthogonal to an installation surface on which the robot 80 is installed. The support base BS may not be divided, and may be divided into three or more portions. Of the two portions, the portion farther from the installation surface is rotatable with respect to the portion closer to the installed surface. A rotation plane of when the distant portion is rotated is parallel to, for example, the installation surface. The rotation plane may not be parallel to the installation surface.

The first arm A1 includes a first end effector E1 and a first manipulator M1.

The first end effector E1 is an end effector holding an object. In this example, the first end effector E1 has finger portions, and holds an object by pinching the object between the finger portions. Alternatively, the first end effector E1 may hold an object by lifting the object by using air suction, magnetic force, or other tools.

The first end effector E1 is communicably connected to the robot control device 70 via a cable. Consequently, the first end effector E1 performs an operation based on a control signal acquired from the robot control device 70. Wired communication using the cable is performed on the basis of a standard such as Ethernet (registered trademark) or a USB. The first end effector E1 may be connected to the robot control device 70 through wireless communication performed on the basis of a communication standard such as Wi-Fi (registered trademark).

The first manipulator M1 has seven joints and a first imaging unit 21. Each of the seven joints has an actuator (not illustrated). In other words, the first arm A1 including the first manipulator M1 is a seven-axis vertical articulated arm. The first arm A1 performs an operation with a seven-axis degree of freedom through cooperative operations among the support base BS, the first end effector E1, the first manipulator M1, and the actuators of the seven joints. The first arm A1 may be operated with a degree of freedom of six or less axes, and may be operated with a degree of freedom of eight or more axes.

In a case where the first arm A1 is operated with a seven-axis degree of freedom, the first arm A1 can take more attitudes than in a case where the first arm A1 is operated with a degree of freedom of six or less axes. Consequently, for example, the first arm A1 is smoothly operated, and can thus easily avoid interference with objects present around the first arm A1. In a case where the first arm A1 is operated with a seven-axis degree of freedom, the first arm A1 is easily controlled since a computation amount is smaller than in a case where the first arm A1 is operated with a degree of freedom of eight or more axes.

Each of the seven actuators of the first manipulator M1 is communicably connected to the robot control device 70 via a cable. Consequently, the actuators operate the first manipulator M1 on the basis of control signals acquired from the robot control device 70. Wired communication using the cable is performed on the basis of a standard such as Ethernet (registered trademark) or a USB. Some or all of the seven actuators of the first manipulator M1 may be connected to the robot control device 70 through wireless communication performed on the basis of a communication standard such as Wi-Fi (registered trademark).

The first imaging unit 21 is, for example, a camera which includes a CCD or a CMOS as an imaging element which converts collected light into an electric signal. In this example, the first imaging unit 21 is provided in a part of the first manipulator M1. Thus, the first imaging unit 21 is moved according to movement of the first manipulator M1. A region which can be imaged by the first imaging unit 21 is changed depending on movement of the first arm A1. The first imaging unit 21 captures a two-dimensional image of the region. The first imaging unit 21 may capture a still image of the region, and may capture a moving image of the region.

The first imaging unit 21 is communicably connected to the robot control device 70 via a cable. Wired communication using the cable is performed on the basis of a standard such as Ethernet (registered trademark) or a USB. The first imaging unit 21 may be connected to the robot control device 70 through wireless communication performed on the basis of a communication standard such as Wi-Fi (registered trademark).

The second arm A2 includes a second end effector E2, and a second manipulator M2.

The second end effector E2 is an end effector holding an object. In this example, the second end effector E2 has finger portions, and holds an object by pinching the object between the finger portions. Alternatively, the second end effector E2 may hold an object by lifting the object by using air suction, magnetic force, or other tools.

The second end effector E2 is communicably connected to the robot control device 70 via a cable. Consequently, the second end effector E2 performs an operation based on a control signal acquired from the robot control device 70. Wired communication using the cable is performed on the basis of a standard such as Ethernet (registered trademark) or a USB. The second end effector E2 may be connected to the robot control device 70 through wireless communication performed on the basis of a communication standard such as Wi-Fi (registered trademark).

The second manipulator M2 has seven joints and a second imaging unit 22. Each of the seven joints has an actuator (not illustrated). In other words, the second arm A2 including the second manipulator M2 is a seven-axis vertical articulated arm. The second arm A2 performs an operation with a seven-axis degree of freedom through cooperative operations among the support base BS, the second end effector E2, the second manipulator M2, and the actuators of the seven joints. The second arm A2 may be operated with a degree of freedom of six or less axes, and may be operated with a degree of freedom of eight or more axes.

In a case where the second arm A2 is operated with a seven-axis degree of freedom, the second arm A2 can take more attitudes than in a case where the second arm A2 is operated with a degree of freedom of six or less axes. Consequently, for example, the second arm A2 is smoothly operated, and can thus easily avoid interference with objects present around the second arm A2. In a case where the second arm A2 is operated with a seven-axis degree of freedom, the second arm A2 is easily controlled since a computation amount is smaller than in a case where the second arm A2 is operated with a degree of freedom of eight or more axes.

Each of the seven actuators of the second manipulator M2 is communicably connected to the robot control device 70 via a cable. Consequently, the actuators operate the second manipulator M2 on the basis of control signals acquired from the robot control device 70. Wired communication using the cable is performed on the basis of a standard such as Ethernet (registered trademark) or a USB. Some or all of the seven actuators of the second manipulator M2 may be connected to the robot control device 70 through wireless communication performed on the basis of a communication standard such as Wi-Fi (registered trademark).

The second imaging unit 22 is, for example, a camera which includes a CCD or a CMOS as an imaging element which converts collected light into an electric signal. In this example, the second imaging unit 22 is provided in a part of the second manipulator M2. Thus, the second imaging unit 22 is moved according to movement of the second manipulator M2. A region which can be imaged by the second imaging unit 22 is changed depending on movement of the second arm A2. The second imaging unit 22 captures a two-dimensional image of the region. The second imaging unit 22 may capture a still image of the region, and may capture a moving image of the region.

The second imaging unit 22 is communicably connected to the robot control device 70 via a cable. Wired communication using the cable is performed on the basis of a standard such as Ethernet (registered trademark) or a USB. The second imaging unit 22 may be connected to the robot control device 70 through wireless communication performed on the basis of a communication standard such as Wi-Fi (registered trademark).

The robot 80 includes a third imaging unit 23 and a fourth imaging unit 24.

The third imaging unit 23 is, for example, a camera which includes a CCD or a CMOS as an imaging element which converts collected light into an electric signal. The third imaging unit 23 may be provided at a part at which a region which can be imaged by the fourth imaging unit 24 can be imaged in a stereo manner along with the fourth imaging unit 24. The third imaging unit 23 is communicably connected to the robot control device 70 via a cable. Wired communication using the cable is performed on the basis of a standard such as Ethernet (registered trademark) or a USB. The third imaging unit 23 may be connected to the robot control device 70 through wireless communication performed on the basis of a communication standard such as Wi-Fi (registered trademark).

The fourth imaging unit 24 is, for example, a camera which includes a CCD or a CMOS as an imaging element which converts collected light into an electric signal. The fourth imaging unit 24 may be provided at a part at which a region which can be imaged by the third imaging unit 23 can be imaged in a stereo manner along with the third imaging unit 23. The fourth imaging unit 24 is communicably connected to the robot control device 70 via a cable. Wired communication using the cable is performed on the basis of a standard such as Ethernet (registered trademark) or a USB. The fourth imaging unit 24 may be connected to the robot control device 70 through wireless communication performed on the basis of a communication standard such as Wi-Fi (registered trademark).

Each of the above-described functional units of the robot 80 acquires a control signal from the robot control device 70 built into the robot 80. Each functional unit performs an operation based on the acquired control signal. The robot 80 may be controlled by the robot control device 70 provided outside instead of the robot control device 70 built thereinto. The robot 80 may not include some or all of the first imaging unit 21, the second imaging unit 22, the third imaging unit 23, and the fourth imaging unit 24.

In a case where the robot system 3 does not include the imaging unit 10, the three-dimensional shape measurement device 30 controls the robot control device 70, and causes some or all of the first imaging unit 21 to the fourth imaging unit 24 of the robot 80 to image the imaging region R2.

As mentioned above, even in a case where the robot system 3 includes the robot 80 which is a double-arm robot instead of the robot 60 which is a single-arm robot, it is possible to achieve the same effect as in Modification Example 1 of the embodiment.

The embodiment of the invention has been described with reference to the drawings, but a specific configuration is not limited to the embodiment, and may be changed, replaced, deleted, or the like without departing from the spirit of the invention.

A program for realizing a function of any constituent element of the above-described device (for example, the three-dimensional shape measurement device 30 and the robot control device 70) may be recorded on a computer readable recording medium, and the program may be read to a computer system so as to be executed. The "computer system" mentioned here is assumed to include an operating system (OS) or hardware such as a peripheral apparatus. The "computer readable recording medium" includes a storage device such as a portable medium such as a flexible disc, a magneto-optical disc, a ROM, or a compact disk (CD)-ROM, and a hard disk built into the computer system. The "computer readable recording medium" is assumed to include a memory which holds a program for a certain period of time, such as a volatile memory (RAM) of a computer system serving as a server or a client when the program is transmitted via a network such as the Internet or a communication line such as a telephone line.

The program may be transmitted from a computer system in which the program is stored in a storage device or the like to another computer system via a transmission media or by using a carrier wave in the transmission medium. Here, the "transmission medium" for transmitting the program includes a medium having a function of transmitting information, for example, a network (communication network) such as the Internet or a communication line such as a telephone line.

The program may realize some of the above-described functions. The program may be a so-called differential file (differential program) which can realize the above-described functions in combination with a program which has already been recorded in the computer system.

The entire disclosure of Japanese Patent Application No. 2017-147587, filed Jul. 31, 2017 is expressly incorporated by reference herein.

What is claimed is:

1. A three-dimensional shape measurement device comprising:
    a controller,
    wherein the controller
        starts a process in which a plurality of different phase pattern images is projected by a projector, and,
        whenever the phase pattern image is projected by the projector before a rising time elapses, the rising time being a time until the luminance of light does not temporally change after a light source of the projector applies the light,
        measures a three-dimensional shape of a target object onto which the phase pattern image is projected on the basis of a captured image obtained by the camera after the process is performed,
    wherein the controller includes
        a processor that is configured to execute the computer-executable instructions,
    wherein the processor is configured to
        receive an operation,
        generate the plurality of phase pattern images in response to the received operation,
        control projection timings at which the projector projects the plurality of phase pattern images and capturing timings at which the camera captures the plurality of phase pattern images projected by the projector,
        cause the projection unit to project the plurality of phase pattern images according to the projection timings,
        cause the camera to capture the phase pattern images according to the capturing timings, and
        measure the three-dimensional shape of the target object on the basis of the captured image obtained by the camera.

2. The three-dimensional shape measurement device according to claim 1,
    wherein the plurality of phase pattern images are four phase pattern images,
    wherein the four phase pattern images represent a wave in which a luminance value periodically changes along a first direction on the phase pattern image,
    wherein the four phase pattern images include a first phase pattern image which is a phase pattern image representing a reference wave, a second phase pattern image which is a phase pattern image representing a wave of which a phase advances by 90 degrees with respect to the wave represented by the first phase pattern image, a third phase pattern image which is a phase pattern image representing a wave of which a phase advances by 90 degrees with respect to the wave represented by the second phase pattern image, and a fourth phase pattern image which is a phase pattern image representing a wave of which a phase advances by 90 degrees with respect to the wave represented by the third phase pattern image, and wherein the controller causes the projector to project the four phase pattern images in an order of the first phase pattern image, the third phase pattern image, the second phase pattern image, and the fourth phase pattern image.

3. The three-dimensional shape measurement device according to claim 1, wherein the processor receives the operation from a user.

4. The three-dimensional shape measurement device according to claim 1, wherein the processor receives a request from another device as the operation.

5. The three-dimensional shape measurement device according to claim 1, wherein the controller measures the three-dimensional shape of the target object onto which the phase pattern image is projected, by using a phase shift method based on the captured image obtained by the camera.

6. A robot system comprising:

a three-dimensional shape measurement device that includes a processor which is configured to execute the computer-executable instructions so as to measure a three-dimensional shape of a target object;

a robot; and a robot controller that moves the robot on the basis of the three-dimensional shape of the target object measured by the three-dimensional shape measurement device, wherein the processor starts a process in which a plurality of different phase pattern images is projected by a projector, and, whenever the phase pattern image is projected by the projector before a rising time elapses, the rising time being a time until the luminance of light does not temporally change after a light source of the projector applies the light, measures the three-dimensional shape of the target object onto which the phase pattern image is projected on the basis of a captured image obtained by the camera after the process is performed, receive an operation, generate the plurality of phase pattern images in response to the received operation, control projection timings at which the projector projects the plurality of phase pattern images and capturing timings at which the camera captures the plurality of phase pattern images projected by the projector, cause the projection unit to project the plurality of phase pattern images according to the projection timings, cause the camera to capture the phase pattern images according to the capturing timings, and measure the three-dimensional shape of the target object on the basis of the captured image obtained by the camera.

7. A three-dimensional shape measurement method comprising:

starting a process in which a plurality of different phase pattern images is projected, and whenever the phase pattern image is projected before a rising time elapses, the rising time being a time until the luminance of light does not temporally change after applying the light, measuring a three-dimensional shape of a target object onto which the phase pattern image is projected on the basis of a captured image after the process is performed, wherein the process includes receiving an operation, generating the plurality of phase pattern images in response to the received operation, controlling the projection timings at which the plurality of phase pattern images are projected and capturing timings at which the plurality of phase pattern images are captured, causing the plurality pattern images to be projected according to the projection timings, causing the phase pattern images to be captured according to the capturing timings, and measuring the three-dimensional shape of the target object on the basis of the captured image.

* * * * *